US011523461B1

(12) United States Patent
Newman et al.

(10) Patent No.: US 11,523,461 B1
(45) Date of Patent: Dec. 6, 2022

(54) PROCEDURES TO INFORM USERS OF INCOMING 5G/6G MESSAGES

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(73) Assignee: ULTRALOGIC 6G, LLC, Palos Verdes Estates, CA (US)

( * ) Notice: Subject to any disclaimer, the term of this patent is extended or adjusted under 35 U.S.C. 154(b) by 0 days.

(21) Appl. No.: 17/881,870

(22) Filed: Aug. 5, 2022

Related U.S. Application Data

(63) Continuation of application No. 17/693,686, filed on Mar. 14, 2022, now Pat. No. 11,438,961.

(60) Provisional application No. 63/317,177, filed on Mar. 7, 2022, provisional application No. 63/220,669, filed on Jul. 12, 2021, provisional application No. 63/214,489, filed on Jun. 24, 2021, provisional application No. 63/210,216, filed on Jun. 14, 2021, provisional application No. 63/176,996, filed on Apr. 20, 2021, provisional application No. 63/170,631, filed on Apr. 5, 2021, provisional application No. 63/170,633, filed on Apr. 5, 2021.

(51) Int. Cl.
*G01L 9/00* (2006.01)
*H04W 76/28* (2018.01)
*H04W 68/00* (2009.01)

(52) U.S. Cl.
CPC ......... *H04W 76/28* (2018.02); *H04W 68/005* (2013.01)

(58) Field of Classification Search
None
See application file for complete search history.

(56) References Cited

U.S. PATENT DOCUMENTS

| | | |
|---|---|---|
| 2006/0011482 A1 | 6/2006 | Brommer |
| 2006/0193279 A1 | 8/2006 | Gu |
| 2007/0014236 A1 | 1/2007 | Jang |
| 2011/0051743 A1 | 3/2011 | Chen |
| 2012/0102129 A1 | 4/2012 | Roy |
| 2012/0127972 A1 | 5/2012 | Trainin |
| 2013/0136044 A1 | 5/2013 | Chun |
| 2014/0301260 A1 | 10/2014 | Park |
| 2014/0301374 A1 | 10/2014 | Malkawi |
| 2015/0071144 A1 | 3/2015 | Wentink |
| 2015/0072736 A1 | 3/2015 | Berionne |
| 2015/0173012 A1 | 6/2015 | Seok |
| 2015/0188799 A1 | 7/2015 | Keskitalo |
| 2015/0296348 A1 | 10/2015 | Ghabra |

(Continued)

*Primary Examiner* — Gary Lafontant
(74) *Attorney, Agent, or Firm* — Mayer & Williams PC

(57) ABSTRACT

In a wireless network, a base station in 5G or 6G often retains a message on hold if the intended user device is temporarily unavailable. To alert the user device, the base station may periodically transmit a polling array consisting of extremely brief (single-bit) indicators at particular time-frequency locations assigned to each user device. The user devices can monitor the polling array, and thereby determine that they have a message on hold. Users can then request the message using a similar terse code. In addition, the base station can divide the user devices into sections, and transmit only the polling array sections that have at least one message on hold, thereby saving time and resources. The user-reply array can be similarly structured, for further resource efficiency. Many other aspects are disclosed.

20 Claims, 11 Drawing Sheets

(56) References Cited

U.S. PATENT DOCUMENTS

| | | |
|---|---|---|
| 2017/0171810 A1 | 6/2017 | Cariou |
| 2019/0281691 A1 | 9/2019 | Lee |
| 2020/0036618 A1 | 1/2020 | Asterjadhi |
| 2021/0204244 A1 | 7/2021 | Rune |
| 2021/0409919 A1 | 12/2021 | Hult |
| 2022/0022227 A1 | 1/2022 | Fong |

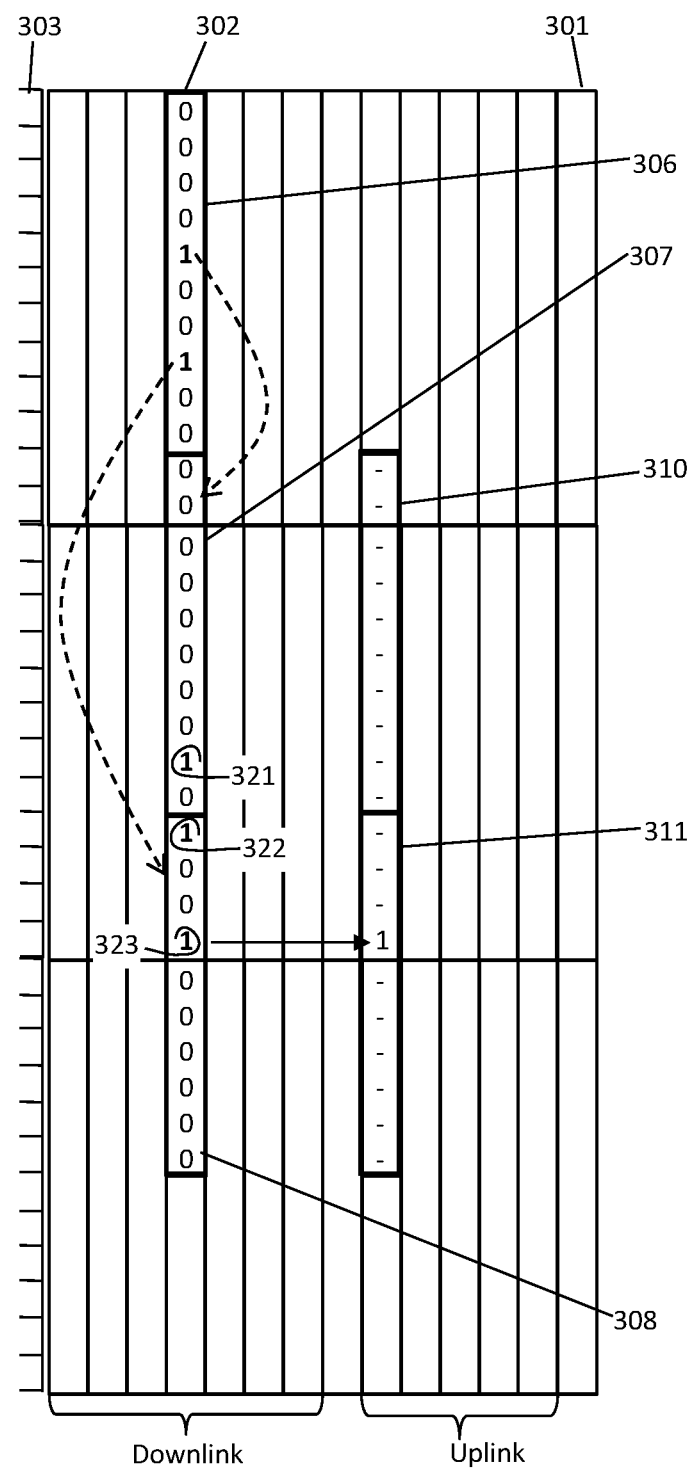

Downlink  Uplink

FIG. 5A

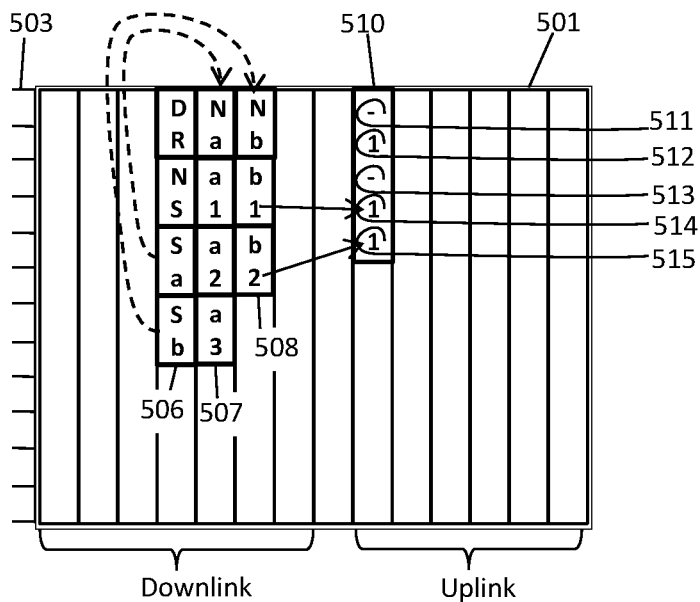

Downlink | Uplink

FIG. 5B

550 - Base station sets up polling array for DRX users, in sections. Upon arrival of a message for a user device, set the array element of that user to 1.

551 - Transmit a polling message with short-form demod reference, a number of non-zero sections, and those section numbers. Use 16QAM or other modulation.

552 - For each non-zero section, transmit a section message including the number of 1's in that section, then the section positions that have messages on hold.

553 - Allocate an uplink reply region. Detect 1-bit uplink reply signals. Identify replying user according to order of replies.

554 - For each reply signal detected, download the requested message, and then set the associated array element to 0. Done.

PROCEDURES TO INFORM USERS OF INCOMING 5G/6G MESSAGES

PRIORITY CLAIMS AND RELATED APPLICATIONS

This application is a continuation of U.S. patent application Ser. No. 17/693,686, entitled "Cascaded Polling for Resource-Efficient Low-Complexity 5G/6G DRX", filed Mar. 14, 2022, which claims the benefit of U.S. Provisional Patent Application Ser. No. 63/170,631, entitled "Rapid Uplink Access by Modulation of 5G Scheduling Requests", filed Apr. 5, 2021, and U.S. Provisional Patent Application Ser. No. 63/170,633, entitled "Rapid Uplink Access by Parallel Signaling on a 5G Random-Access Channel", filed Apr. 5, 2021, and U.S. Provisional Patent Application Ser. No. 63/176,996, entitled "Rapid Uplink Access by Modulation of 5G Scheduling Requests", filed Apr. 20, 2021, and U.S. Provisional Patent Application Ser. No. 63/210,216, entitled "Low-Complexity Access and Machine-Type Communication in 5G", filed Jun. 14, 2021, and U.S. Provisional Patent Application Ser. No. 63/214,489, entitled "Low-Complexity Access and Machine-Type Communication in 5G", filed Jun. 24, 2021, and U.S. Provisional Patent Application Ser. No. 63/220,669, entitled "Low-Complexity Access and Machine-Type Communication in 5G", filed Jul. 12, 2021, and U.S. Provisional Patent Application Ser. No. 63/317,177, entitled "Cascaded Polling for Resource-Efficient Low-Complexity 5G/6G DRX", filed Mar. 7, 2022, all of which are hereby incorporated by reference in their entireties.

FIELD OF THE INVENTION

The disclosure pertains to DRX (discontinuous reception) and means for indicating which user devices have incoming messages on hold.

BACKGROUND OF THE INVENTION

In 5G and 6G, a user device using DRX (discontinuous reception) may be in an idle or "sleep" state when the base station tries to download a message addressed to the user device. What is needed is a way for the base station to inform the user devices that they have an incoming message on hold when the user devices are ready to receive it.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a base station of a wireless network to poll user devices of the wireless network, the method comprising: transmitting a polling array comprising a plurality of polling elements, wherein each polling element is associated with one of the user devices respectively, and each polling element comprises one resource element, wherein each polling element is set to a first value when the base station is holding a message for the associated user device, and to a second value when the base station is not holding a message for the associated user device; allocating a reply region comprising a plurality of reply elements, each reply element assigned to one of the user devices respectively; monitoring the reply region to detect single-bit reply signals from the user devices; and for each reply signal detected in the reply region, determining which user device requests transmission of a message on hold.

In another aspect, there is a particular user device, of a wireless network comprising a plurality of user devices, the particular user device configured to: receive, from a base station, one or more messages indicating a section number of a particular section and a position number of a particular position within the particular section; at a predetermined time and frequency, receive an index message indicating one or more sections; determine, according to the index message, whether the particular section is indicated in the index message; receive the polling message comprising polling elements of sections that are indicated in the index message, wherein each polling element indicates whether one of the user devices has an incoming message waiting at the base station; and if the particular section is included in the polling message, determine, according to a particular polling element of the polling message, whether the particular user device has an incoming message waiting at the base station.

In another aspect, there is non-transitory computer-readable media in a base station or core network of a wireless network, the wireless network comprising a plurality of user devices in signal communication with the base station, the media containing instructions that when implemented by a computing environment cause a method to be performed, the method comprising: determining integer Nsect sections, each section comprising integer Npos positions within the section; assigning each user device to one of the sections and one of the positions, respectively; determining which sections include at least one waiting user device, wherein a waiting user device is a user device that has a message holding in the base station; determining how many waiting sections are in the network, wherein a waiting section includes at least one waiting user device; and determining how many waiting user devices are in each waiting section.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 3A is a schematic showing an exemplary embodiment of a resource grid including a polling message and user device responses, according to some embodiments.

FIG. 5A is a schematic showing an exemplary embodiment of a resource grid including a modulated polling message, according to some embodiments.

FIG. 5B is a flowchart showing an exemplary embodiment of a process for broadcasting a modulated polling message, according to some embodiments.

Like reference numerals refer to like elements throughout.

DETAILED DESCRIPTION

Figure 1A:
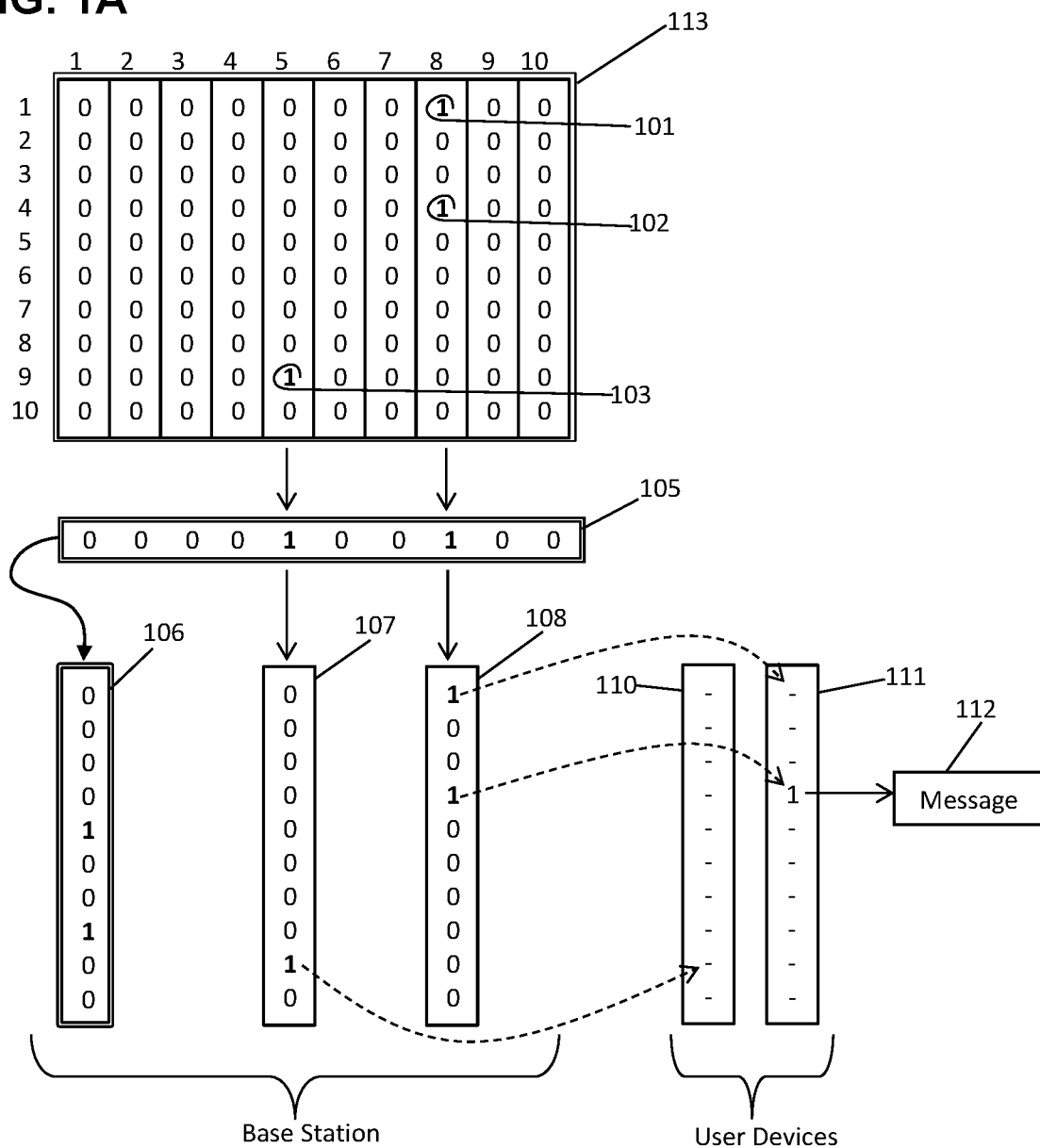
FIG. 1A is a schematic showing an exemplary embodiment of a method for a base station to broadcast a polling message to user devices in a cascaded manner, according to some embodiments.

Many if not most of the future 5G and 6G user devices are expected to be low-cost, reduced-capability single-task devices such as sensors and actuators in a highly-connected manufacturing or commercial or domestic environment. Such devices are typically highly energy-constrained due to, for example, requirements for very long-life battery operation without maintenance. In addition, such applications usually do not require low latency or fast responses or other high-performance features of 5G/6G. Therefore, these devices typically employ "DRX" (discontinuous reception) or "sleep-mode" to periodically become idle or inactive, thereby greatly reducing energy consumption. However, an incoming message addressed to a particular user device (recipient) may arrive at the base station while the particular user device is idle, in which case the base station may hold or store the incoming message temporarily in memory, for example. Disclosed herein are systems and methods for the base station to indicate which user devices have an incoming message on hold, and for those recipient user devices to request that the message be transmitted to them. To save time and energy and wireless resources, the base station may transmit a "polling message", which is a downlink message broadcast by a base station, generally using in a terse code. For example, the code may include a cascaded (successively parsed) array of values, or a "poll list", or a list of identification codes, or a list of addresses in the array, or other code configured to indicate which user device has a message on hold. The user device, upon "waking" and receiving such a polling message, may then respond by transmitting a signal in an allocated uplink reply region of the resource grid, such as in a time interval scheduled for uplink messages. The uplink reply signal may use a terse code matching the polling message code, or may send a 1-bit signal on a specific subcarrier, or the uplink reply signal have a different format. The timing or frequency of the uplink reply signal may be based on the order of polling, or otherwise may indicate which user device is ready to receive the incoming message. Receiving a polling message and transmitting an uplink reply signal, the user device may initiate the message download while avoiding complex handshaking protocols and their attendant delays, thereby greatly reducing wasted time and wasted resources, according to some embodiments. In addition, many of the disclosed procedures may be within the capabilities of low-cost or reduced-capability user processors, thereby greatly expanding the commercial opportunities for wireless devices in the coming decades, according to some embodiments.

Systems and methods disclosed herein (the "systems" and "methods", also occasionally termed "embodiments" or "arrangements", generally according to present principles) can provide urgently needed wireless communication protocols to reduce wasted resources and delays while facilitating low-complexity communication and provide readily available options to accommodate reduced-capability user devices, according to some embodiments. The low-complexity communication may be performed according to 5G and/or 6G technology. Protocols and standards may be added to 5G and/or 6G to provide the services disclosed herein. The motivation behind the present disclosure is to provide polling messages and user responses compatible with sparse rural as well as dense urban/industrial wireless environments.

Disclosed herein is a "polling array" or "poll list" consisting of array elements in a memory of a base station or core network, each array element associated with one of the user devices, respectively. In some embodiments, each array element may be assigned to one of the user devices in the network. In other embodiments, the polling array may include only the user devices that have indicated an intention to use DRX. In yet other embodiments, the polling array may be sized according to the maximum number of user devices that the base station can manage. The base station may "prepare" the polling array by initially setting each element of the polling array to a first value, such as "0". Upon receiving an incoming message addressed to a particular user device, the base station can set the array element associated with that user device to a second value, such as "1". After successfully transmitting the message to the user device, the base station can set the associated array element back to 0. Thus the polling array indicates which array elements are set to the second value, and therefore which user devices have a message on hold.

In some embodiments, the base station may broadcast a "polling message" which is a downlink message configured to indicate which user devices have incoming messages on hold. The polling message may be broadcast according to a pre-arranged schedule, such as periodically, or may be transmitted with a heading or other feature indicating that it is a polling message. The schedule or periodicity or heading or other feature indicating when the polling message occurs, may be specified in a system information message, or an RRC message, or otherwise indicated to the user devices, so they can determine when to receive the polling messages. In some embodiments, the polling message may be broadcast according to 5G or 6G technology.

In some embodiments, the polling message may be "cascaded" to reduce resource usage and save time. As used herein, "cascaded" refers to a parsing process in which an array or list may be divided into a plurality of sections, each section including a number of section elements, so that each section can be indicated separately in the polling message. Each section is merely a reproduction of a portion of the polling array. As used herein, the elements of the polling array are termed "array elements", and the elements of each section are termed "section elements". A particular user device is associated with one of the array elements, and is also associated with one of the section elements. Examples below disclose polling messages that include only the sections that have at least one user device with an incoming message on hold. Equivalently, the polling message may include only those sections of the array that have at least one section element set to 1. Cascaded polling, in which the base station avoids transmitting the sections that lack messages on hold, may thereby take less time and resources than broadcasting the entire polling array, especially if (as is generally the case) most of the array elements are 0, and most of the sections have no messages on hold.

In some embodiments, the polling message may include an index message. An index, as used herein, is a set of index elements, each index element configured to summarize the contents of one of the sections, respectively. For example, each index element may be set to 0 if all of the section elements are 0 in the associated section (meaning that the section has no messages on hold), and the index element may be set to 1 if any of the section elements is a 1 in that section (meaning that at least one user device in that section has a message on hold). Thus the index can indicate which sections include at least one user device with an incoming message on hold. The sections that contain no messages on hold generally need not be transmitted. The user devices can receive the index message and, based on which index elements are set to 1, can determine how many sections are following, and which sections. The base station can then broadcast each section that has at least one incoming message on hold. Upon receiving the polling message, each user device can determine whether its section is among the transmitted sections, based on the index message. If so, then the user device can check within its associated section message, locate the section element associated with that user device, and determine whether that section element is a 1, thereby indicating that the user device has a message holding. If so, then the user device can request the message. If, on the other hand, the index message indicates that the user device's section is not among those with messages holding, then the user device can go back to sleep mode, without bothering to receive and interpret the section messages, since the index message has already indicated that the user device does not have a message on hold. In addition, if the user device's section is included in the polling message, the user device can check the section message associated with that user device, and thereby determine whether the user device's section element is a 0 or 1. If the user device's section element is 0, then the user device can sleep at that time without further processing, since it has no messages on hold. But if the user device's section element is a 1, the user device can thereby determine that it has a message on hold, and the user device can request its message. As a further option, if traffic is light and there happen to be no messages on hold at all, then the polling array would be entirely 0, in which case the base station would transmit only the index, and no section messages. However, if there is one message holding for a particular user device, then the index would be all 0's except a single 1 in the index element corresponding to the particular user device's section, and the base station would transmit only one section message, showing that section with a single 1 in the particular user device's position in the section message. For specificity, "Narray" is the size of the array, "Nsections" is the number of sections, "Nsectsize" is the number of array elements in each section. Hence Narray=Nsections×Nsectsize. The number of index elements in the polling index equals Nsections, that is, each section is associated with one of the index elements and vice-versa. Importantly, by not transmitting the empty sections, the base station can save substantial time and resources, and the user devices can save substantial energy.

In some embodiments, a section message may specify the user devices according to a "section address" or "position" in that section. As used herein, the section address or position in a section refers to the user device's address relative to the start of that section. In addition, the user device may be identified according to its "array address" in the polling array. Thus the array address of a user device equals the section address plus the position of the user device within that section. Equivalently, the array address equals the section position in the array, plus the section number times the size of each section. Thus a particular user device is simultaneously a member of the polling array and one of the sections. As used herein, in reference to array elements or section elements, the terms "position" and "address" may be used interchangeably.

In some elements, the user device can request its message by transmitting a very brief signal within an allocated uplink reply region. An "uplink reply region" is a region of a resource grid, including a set of symbol-times and subcarriers allocated for user devices to request their messages. In some embodiments, the uplink reply region may be the same size and shape (that is, same number of symbol-times and subcarriers) as the set of section messages, in which case the user device can transmit its signal in the time and frequency that corresponds to that user device's section element. The base station can then receive the uplink reply signal, determine which section the requesting user device is in (according to which symbol-time the uplink signal is in), and can determine which section element is assigned to the requesting user device (according to which subcarrier the uplink signal is in), and can thereby determine which user device transmitted the uplink reply signal.

In another embodiment, a more compact uplink reply region may be allocated. In that case, the user device may determine its "order of notification" or simply its "order" according to how many other users are indicated in the section messages before that user device. The user device may then transmit its signal in the uplink reply region according to its order. For example, if the user device is the first one to be listed in the section messages as having a message on hold, then the user device can transmit its uplink reply signal in the first subcarrier of the uplink reply region. If the user device is the second one indicated in the polling message, then the user device can transmit its signal in the second subcarrier, and so forth. The user device can count the number of message-holding indicators (such as 1's) in the section messages, and thereby determine its order of notification, and thereby determine which subcarrier to transmit its uplink signal on. Likewise, the base station can determine which user device requests its message by noting which subcarrier the signal is on, in the uplink reply region.

In other embodiments, each section message may be a list of addresses of section elements that are 1's, that is, a list of user device section addresses that have messages on hold.

Such listing may be more compact than transmitting the whole section, especially when most of the section elements are 0. Upon receiving the section message, the user device can recognize its section address (or position), and can count the number of other user devices already indicated as having messages on hold, and can thereby determine its order of notification. Specifically, the user device may count how many other user positions or addresses are listed in the polling message before that user device, and can thereby determine which subcarrier to use for its uplink signal.

In another embodiment, the base station may include, in the polling message, a list of network-issued identification codes of the user devices that have messages. For example, the base station may transmit a list of identification codes (such as C-RNTI codes) of the users that have messages on hold. The base station can then allocate an uplink reply region with the same number of subcarriers as user devices with messages on hold. Each user device listed in such a polling message can determine its order of notification by counting the number of identification codes listed in the polling message ahead of the user device's code, and can then transmit its uplink signal on a subcarrier corresponding to that order. The base station can then determine which user devices request their messages according to which uplink reply subcarriers are occupied by the uplink signals, each subcarrier corresponding to one of the user device addresses listed in the polling message.

In some embodiments, the uplink reply signal may be any electromagnetic energy as long as it is at the subcarrier frequency and is contained within the allocated symbol-time. Since there is generally no room for demodulation references in the uplink reply region, the base station can be configured to interpret any transmitted energy, regardless of modulation, as a request for the corresponding message. Alternatively, the uplink reply signals may be modulated in a modulation scheme that does not depend on amplitude determination, such as QPSK, and may thereby include additional information in the reply signal. The uplink reply signals are not in contention because they are transmitted at different frequencies.

Terms herein generally follow 3GPP (third generation partnership project) standards, but with clarification where needed to resolve ambiguities. 5G and 6G technologies are designed for "eMBB" (enhanced Mobile Broadband communications), "URLLC" (ultra reliable low latency communications), and "mMTC" (massive machine-type communication) in the "IoT" (internet of things). "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. ("Base station" and "core network" are used interchangeably herein.) The time-frequency space is generally configured as a "resource grid" including a number of "resource elements", each resource element being a specific unit of time termed a "symbol-time", and a specific frequency and bandwidth termed a "subcarrier" (or "subchannel" in some references). Symbol-times may be termed "OFDM symbols" (Orthogonal Frequency-Division Multiplexing) in references. The time domain may be divided into ten-millisecond frames, one-millisecond subframes, and some number of slots, each slot including 14 symbol-times. The number of slots per subframe ranges from 1 to 8 depending on the "numerology" selected. The frequency axis is divided into "resource blocks" (also termed "resource element groups" or "REG" or "channels" in references) including 12 subcarriers. Each subcarrier is at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol-time in time and a single subcarrier in frequency, is the smallest unit of a message. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Communication in 5G and 6G generally takes place on abstract message "channels" (not to be confused with frequency channels) representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user devices, among other channels that may be in use. In addition, one or more random access channels may include multiple random access channels in a single cell. "CRC" (cyclic redundancy code) is an error-checking code. "RNTI" (radio network temporary identity) and "C-RNTI" (cell radio network temporary identification) are network-assigned user codes (RNTI and C-RNTI and the other flavors of RNTI are used interchangeably herein). "SNR" (signal-to-noise ratio) and "SINK" (signal-to-interference-and-noise ratio) are used interchangeably unless specifically indicated. "RRC" (radio resource control) is a control-type message from a base station to a user device. "DRX" (discontinuous reception) refers to user devices temporarily entering a "sleep" or idle state to save energy. "H-ARQ" (hybrid automatic repeat request) is a complex procedure for determining when to retransmit a failed message.

In addition to the 3GPP terms, the following terms are defined herein. Although in references a modulated resource element of a message may be referred to as a "symbol", this may be confused with the same term for a time interval, among other things. Therefore, each modulated resource element of a message is referred to as a "modulated message resource element", or more simply as a "message element", in examples below. A "demodulation reference" is a set of modulated resource elements that exhibit levels of a modulation scheme (as opposed to conveying data). A "calibration set" is one or more amplitude values, which have been determined according to a demodulation reference, representing the predetermined amplitude levels of a modulation scheme. A "polling array" is a set of array elements, one array element per user device, each array element indicating whether an associated user device has a message on hold. A "section", in this context, refers to a portion of a polling array. A "polling index" is a set of "index elements", one index element per section of a polling array, each index element indicating whether the associated section includes any messages on hold. A "polling message" is a downlink message or a series of messages indicating which user devices have messages on hold. An "uplink reply region" is an interval and bandwidth allocated for user devices to request their messages on hold. A "short-form demodulation reference" is a demodulation reference exhibiting the maximum and minimum modulation levels of a modulation scheme, from which a receiver can calculate all of the modulation levels of the modulation scheme.

"Low-complexity" refers to devices and procedures necessary for wireless communication, exclusive of devices and procedures that provide high-performance communication. 5G/6G specifications include many procedures and requirements that greatly exceed those necessary for wireless communication, in order to provide high-performance communications at low latency and high reliability for users that demand it. Compared to scheduled and managed 5G/6G messaging, low-complexity procedures generally require less computation and less signal processing. For example, low-complexity procedures may be tailored to minimize the number of separate operations required of a device per unit of time. 5G and 6G specifications include a very wide range of options and contingencies and versions and formats and types and modes for many operations, to achieve maximum flexibility. A low-complexity specification may include defaults for each operation, and those defaults may be the simplest choices, or at least simpler than standard 5G and 6G procedures. "Simpler" procedures generally require fewer computation steps and/or smaller memory spaces than corresponding procedures in standard 5G/6G. Computation steps may be measured in floating-point calculations, for example.

"Reduced-capability" refers to wireless devices that cannot comply with 5G or 6G protocols, absent the systems and methods disclosed herein. For example, regular 5G and 6G user devices are required to receive a 5 MHz bandwidth in order to receive system information messages. Regular user devices are required to perform high-speed signal processing such as digitizing the received waveform, applying digital filtering or Fourier transforming an incoming waveform, phase-dependent integrating at several GHz frequency, and separating closely-spaced subcarriers. A reduced-capability device, on the other hand, may not need the high performance gained by such procedures, and may be incapable of performing them. A reduced-capability device may be able to receive a narrow-band wireless signal, demodulate the message, and interpret the content without further processing. For economic reasons as well as commercial feasibility, future IoT application developers will demand ways to transmit messages using bandwidths and protocols appropriate to the simpler devices. It is important to provide such low-complexity options early in the 6G roll-out, while such flexibility can still be incorporated in the system design.

Accordingly, the systems and methods disclosed herein may provide low-complexity procedures for a base station to indicate, in a terse code, which user device has an incoming message on hold, and for the user device to indicate that it is ready to receive the message. The code may include a polling array indicating which user devices have a message on hold. The polling array may be divided into sections. A polling index may indicate which sections include at least one message on hold. In some embodiments, the base station can transmit the polling index followed by the non-zero sections of the polling array, among other versions disclosed below. Each user device, after determining that it has a message on hold, can request the message by transmitting a short uplink signal at an allocated reply time and frequency.

FIG. 1A is a schematic showing an exemplary embodiment of a method for a base station to broadcast a polling message to user devices in a cascaded manner, according to some embodiments. As depicted in this non-limiting example, a polling array 113 includes array elements, each array element associated with one of the user devices, respectively. The base station can set each array element to a first value "0" or a second value "1", depending on whether the associated user device has an incoming message on hold. In the depiction, the polling array 113 has one hundred entries, but in other embodiments it could have any size. The polling array is divided into ten sections by column in this case, as numbered across the top, each column being a section of the polling array 113. Hence the number of sections equals ten in this case, and each section holds ten section elements, although in other embodiments the array could be sectioned in any number of other ways. Each section element is also an array element, and vice versa. As shown, almost all of the array elements are 0. The polling array 113 includes only three elements 101, 102, 103 which are set to 1. Each 1 in the polling array may be termed a "message alert" since it alerts the associated user device that it has a message on hold. In this case, the three message alerts indicate that three user devices have messages on hold. Those three user devices may be termed a first, second, and third user device, which are associated with the non-zero array elements 101, 102, 103 respectively. The first user device 101 is in section five, and the other two user devices 102, 103 are in section eight. Hence, only sections five and eight include messages on hold, and only those two sections need be transmitted, in this example.

Each index element is a summary of the section that it corresponds to. The index 105 has one index element for each section, and therefore the number of index elements equals Nsections which is ten in this case. Each index element is set to 0 if all of the array elements in the corresponding section are 0, and the index element is set to 1 if one or more array elements in that section is a 1, as suggested by a couple of arrows. Each index element is the logical "OR" of the array elements (or section elements) of the corresponding section. The index 105 therefore includes all zeroes except a 1 in index positions five and eight, indicating that only sections five and eight have messages on hold.

The index is shown again as 106, but now in column form. Adjacent are two additional columns 107 and 108, which duplicate the array elements of those two sections (five and eight, respectively). Column 107 reproduces section five of the polling array 113, and column 108 reproduces section eight of the polling array 113, since those are the only sections that include message alerts. The base station can then transmit the index message 106, typically as a frequency-spanning message (that is, transmitted in multiple subcarriers at a single symbol-time), followed by two section messages 107 and 108, which are the only sections that contain non-zero data. Thus, in this case, the polling message includes the index message 106 followed by the section messages 107 and 108.

User devices can receive the index message 106 and determine which sections are to be transmitted, according to which index elements are set to 1. The user devices can then receive the two section messages 107 and 108, having determined from the index message that those two section messages 107, 108 include the array elements in sections five and eight of the polling array. Each user device knows which array element is associated with it, and therefore knows which section it is in. Each user device can then determine, from the index message 106 and the section messages 107 and 108, whether the user device has an incoming message on hold. In this example, the three user devices 101, 102, 103 can determine, from the index message 106 and the section messages 107, 108, that they have messages on hold.

The base station can allocate a certain uplink reply region for the user devices to transmit signals indicating their request to receive their messages. For example, the base station can allocated resource regions 110 and 111 for such uplink replies. In the present example, however, the first two user devices 101, 102 are still asleep when the polling message is transmitted, and therefore those user devices do not respond, as indicated by curvy arrows leading to a blank "-", indicating no signal, in their corresponding uplink reply columns 110 and 111. The third user device 103 is awake, and it detects the 1 in its position (position four) of its section (the eighth column 108), and thereby determines that it has a message holding. The third user device 103 may then request that its message be downloaded, by transmitting a signal at its allocated time in the uplink reply region which is position four in column 111 as shown. Thus in the uplink reply region, a silence at a particular subcarrier indicates that the associated user device does not request anything (either because it has no incoming messages, or because the user device was asleep at the time), whereas a 1 in that position indicates that the associated user device is awake and is ready to receive its message on hold.

The download requests may employ the same cascaded code as the section messages 107, 108. For example, the base station may provide an uplink reply region with the same size and shape as the section messages, each element of the uplink reply region corresponding to one of the user devices in those section messages. In the depicted case, the base station allocates two symbol-times 110 and 111 for uplink request signals, by the user devices that have messages holding (and are awake at that time). The size and order of the uplink resources 110, 111 may match the size and order of the downlink section messages 107, 108, so that each responding user device can configure its reply signal at the same section and subcarrier as its alert value in the section messages. In this example, the number of symbol-times in the uplink reply region equals the number of symbol-times occupied by the section messages, and the number of subcarriers occupied by the uplink reply region equals the number of subcarriers occupied by the section messages. The user device can request its message by transmitting a brief signal at the symbol-time and subcarrier matching its non-zero entry in the associated section message. In the depicted example, the first and second user devices are not yet available and therefore they do not transmit signals at their allocated subcarriers in 110 and 111, but the third user device is available and therefore transmits an uplink signal in its position (fourth subcarrier) of the second allocated symbol-time 111 which corresponds to its section message 108. Accordingly, the allocated uplink resources 110 and 111 have blank "-" entries (indicating no signal), except for a single 1 value in column 111 associated with the third user device. The blank entries represent zero transmission, and the 1 entry represents a single 1-bit signal transmitted by the associated user device on the indicated subcarrier and symbol-time of the allocated uplink resources. The uplink resources are not in contention because each user device has a different subcarrier allocated, according to the position of its assigned array element in the section message. Most of the uplink reply positions in 110 and 111 are null because most of the user devices do not have messages waiting (or they are still asleep). In the present example, only one signal is transmitted, by the third user device, at position four of the second column 111, thereby requesting its held message.

The base station, monitoring the uplink reply region 110 and 111, determines that the first user device (associated with array value 101) is still asleep, since there is no transmission in the first uplink column 110. The base station also determines that the second user device (array value 102) is also asleep since the first subcarrier in column 111 is blank. However, the base station can readily detect the signal transmitted by third user device (array value 103) in column 111 at the fourth subcarrier, and can determine that the third user device wants its message. The base station therefore transmits the message 112 to the waiting user device. Then, after receiving a positive acknowledgement, the base station can reset the corresponding array element to 0 and delete the corresponding message.

In summary, the base station can maintain a polling array of array elements, each array element indicating whether its associated user device has an incoming message on hold. The base station can divide the array into sections and prepare an index, one index element per section, and set each index element to indicate whether any of the user devices in each section has a message on hold. The base station can then broadcast the polling message periodically, or on demand, or otherwise scheduled or notified by the base station. The polling message may include the index and whichever sections include at least one user device with an incoming message on hold. The user devices can receive the index message and thereby determine which sections are forthcoming. The user devices can receive those section messages and determine, from the section elements, whether each user device has a message on hold. If the user device does have a message on hold, the user device can then request transmission of the message by transmitting a signal in an allocated uplink reply region. In this case, the uplink reply region mirrors the section messages. The base station can receive the uplink reply signals, determine which user device requests its message by noting the subcarrier frequency and symbol-time of the uplink reply signal, and then can download the message to that user device. By avoiding transmitting sections that have no alerts therein, the base station can save substantial resources. By avoiding complex and unnecessary handshaking, the user devices can avoid wasted time and energy. By avoiding complex and lengthy control messages, the user devices can obtain their messages without further delay, using only low-complexity procedures, according to some embodiments.

Figure 1B:
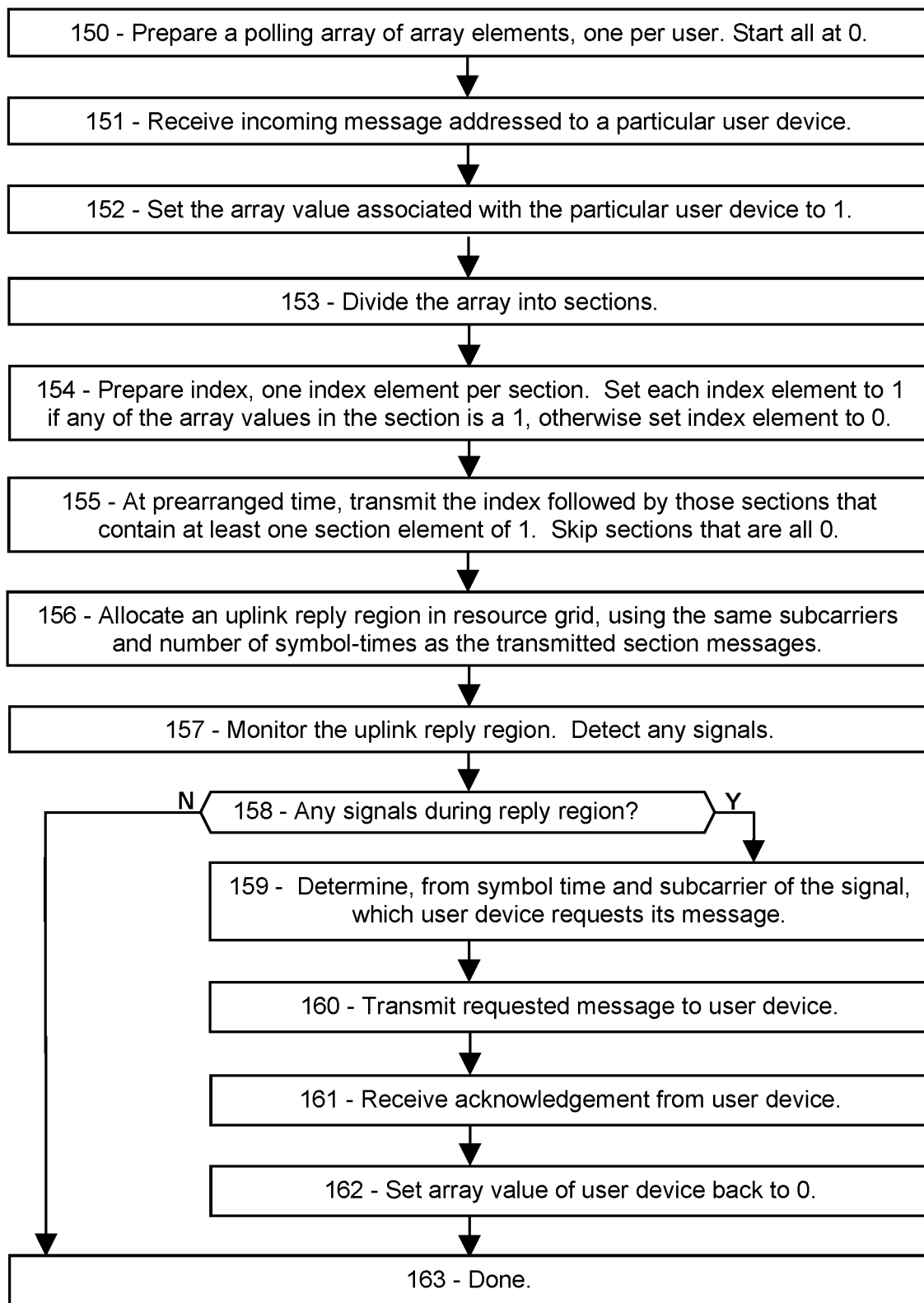
FIG. 1B is a flowchart showing an exemplary embodiment of a method for a base station to broadcast a polling message to user devices in a cascaded manner, according to some embodiments.

FIG. 1B is a flowchart showing an exemplary embodiment of a method for a base station to broadcast a polling message to user devices in a cascaded manner, according to some embodiments. As depicted in this non-limiting example, at 150 a base station may prepare a polling array of array elements, all initially set to 0. At 151, the base station receives an incoming message addressed to a particular user device. At 152, the base station sets the array element associated with the recipient user device to 1, indicating that the user device has a message holding. At 153, if not sooner, the base station can divide the polling array into sections. At 154, the base station can prepare an index with one index element per section. The base station can set each index element according to the array elements in the corresponding section, or equivalently, according to the section elements. If all of the array elements in a particular section are 0, then the index element is set to 0, and if one or more of the array elements in the section are 1, then the index element is set to 1. Thus the index indicates which sections have at least one message holding.

At 155, at a prearranged time, the base station broadcasts the index message. Then, or concurrently on different frequencies, the base station broadcasts the array sections that have messages holding. The base station does not transmit the sections that have no messages holding, in this embodiment. Thus the number of transmitted sections equals the number of index elements that are set to 1.

If the array happens to be empty (no messages holding at all), then the base station can transmit the index (with all 0's) and no sections, and is done. Assuming in this example that at least one message is holding, at 156 the base station allocates an uplink reply region of the resource grid, for user devices to indicate that they are ready to receive their messages. The uplink reply region may be configured as the same shape, in time-frequency space, as the transmitted sections (but not including the index message). For example, the uplink reply region may begin in the first scheduled uplink interval following the polling message, and may have the same number of symbol-times as the section messages, and may occupy the same subcarriers as the section messages, thereby providing a predetermined uplink reply region to the user devices. The user devices which are awake and are able to receive their messages, can determine, from the index elements, which sections are to be broadcast. The user devices and also determine, from their own position within the section, whether each user device has a message holding. The user devices can then request their messages, in this example using that same code. Specifically, each user device with a message on hold can transmit a signal at a particular symbol-time corresponding to its section in the polling message, and at a particular subcarrier corresponding to the user device's position in the section message. The user device can thereby indicate to the base station that the associated incoming message is to be downloaded. The other user devices, which do not have a message holding, may transmit nothing.

At 157, the base station can monitor the uplink reply region and detect any signals transmitted by the user devices. At 158, the base station determines whether any signals appear in the uplink reply region, and if not, the base station is done at 163. If one or more signals are present in the uplink reply region, then at 159 the base station can determine, based on the symbol-time and subcarrier of the signal, which user device requests its message on hold. At 160, the base station transmits the requested message to a requesting user device, and receives an acknowledgement at 161 indicating that the user device has received the message. Therefore, at 162, the base station sets the array value corresponding to that user device back to 0, deletes the message, and is done at 163.

In some embodiments, the base station can broadcast the index and selected sections on a pre-arranged schedule, such as once per frame or subframe or 1 second or 10 seconds, for example. In other embodiments, the base station may set up a more elaborate schedule, for example to accommodate high-QoS users. In other embodiments, the base station may transmit polling messages only when the polling array has at least one incoming message on hold, at which point the base station may broadcast an intent to transmit the polling message at a particular time, followed by the polling message. Alternatively, the base station may broadcast the polling message at will, by including a header that identifies the message as a polling message.

In some embodiments, the base station can prepare two polling arrays, one for high-QoS or delay-sensitive user devices, and a second array for low-QoS or delay-insensitive user devices. The base station can then broadcast the index and non-zero sections of the high-QoS polling array more frequently than the low-QoS polling array. For example, the base station may broadcast the high-QoS polling message once per frame or subframe, and may broadcast the low-QoS polling message less often such as once per second or ten seconds, for example. In addition, at times when both of the arrays are due to be broadcast, the base station can broadcast them in a pre-arranged order, such as broadcasting the high-QoS polling message first, and waiting for the uplink responses, then broadcasting the low-QoS polling message and waiting for those responses. Alternatively, the base station can combine the low-QoS and high-QoS arrays when both are due.

In some embodiments, the base station can select the number of sections equal to the square root of the number of array elements. For example, if the polling array includes 100 user devices, then the base station can divide the array into 10 sections, and prepare an index with 10 index elements. For a larger network accommodating, say, 65536 users, there would be 256 sections, each with 256 section elements.

In some embodiments, the base station can select the number of sections according to a cube root of the number of array values. For example, if the alert array includes 4096 array values, the base station can select 16 sections, each section having 16 sub-sections, and each sub-section having 16 user devices. For a larger array with, say 1 million users, the base station may select 100 sections, each with 100 sub-sections, each sub-section having 100 user devices. The base station can also prepare an index with one index element per section, and a number of sub-indexes for each of the index elements, with one sub-index per sub-section. Initially, the base station may set all of the array elements to 0, and thus all of the section and sub-section elements to 0, and all of the index and sub-index elements to 0. Upon receiving a message addressed to a particular user device, the base station may set the array element associated with the particular user device to 1, and may also set to 1 the index element and sub-index element that the user device belongs to. The index shows which of the sections has a message holding, and the sub-indexes show which of the sub-sections have a message holding, and the sub-sections themselves show which of the user devices has a message holding. The base station can then periodically broadcast the index, followed by whichever sub-indexes are non-zero, followed by whichever sections and sub-sections include a non-zero array value. The user devices can receive the index and determine which of the sub-indexes are forthcoming, and can receive the sub-indexes and determine which of the array sub-sections are to be forthcoming, and can receive those sub-sections and determine whether each user device has an incoming message on hold. To consider a specific example, the base station may have 1 million user devices (or potential user devices), and may prepare a polling array of 1 million array elements. At a particular time, only one user device has a message holding. The base station can broadcast the index which has 100 index elements, all zero except a single 1 corresponding to the user device's section, followed by a single sub-index which also has 100 values, all zero except a single 1 corresponding to the user device's sub-section, followed by that sub-section which has all zeroes except a single 1 in the user device's position in that sub-section. The user device can thereby determine that it has a message holding, and all the other 999,999 users can determine, from the index or the sub-index or the sub-section values, that they do not have a message holding. Then the user device can reply in a subsequent uplink response region by sending a signal at the subcarrier corresponding to the user device's position in the sub-section, as indicated by the 1 in the sub-section message. The base station, detecting that signal, can then download the message on hold.

In some embodiments, the base station can also accommodate higher-priority user devices that do not use DRX. For example, the base station can download a message to a particular user device without delay if the base station knows that the particular user device is an "always-on" device. If the user device does not use DRX, the base station can download the incoming message in the next scheduled downlink period, or at other convenient time, without waiting for a scheduled polling session. However, many if not most of the user devices in future networks may employ DRX, and therefore they may have extended intervals of inactivity or "sleep periods" during which the user devices may be unable to receive messages. In addition, a low-cost reduced-capability user device adapted to a single task may be unable to receive messages while performing some demanding operation, such as any operation that requires real-time synchronization. Such a time-critical operation could be interrupted if the device attempted to receive a message simultaneously. In these and many other situations, the base station may hold the incoming message in memory until the user device can receive it.

In some embodiments, the polling array size may be the maximum number of user devices that the base station can accommodate, regardless of the actual number of registered users. In other embodiments, the array size may be the current number of DRX users (not including the always-on devices). In further embodiments, the array size may include an additional buffer, such as an additional 10%, to accommodate additional users or failed downloads. In some embodiments, the array size may be an expected maximum number of users in an interval, such as a 24-hour interval, based on historical records. In some embodiments, the array size may be switched between standard numbers, such as powers of two for example, according to the number of user devices or DRX users. For example, the base station may have an array size of 32 at night when traffic is very low, and may switch to an array size of 2048 during heavy daytime usage. In that case, an RRC or other broadcast may indicate when the array size switches between the two sizes, so that the user devices can update their assumptions accordingly.

In some embodiments, the base station may transmit the index message and the section messages by transmitting the 0 and 1 values explicitly, such as using two different modulation states of a modulation scheme such as BPSK to represent each 0 or 1 array value. The user devices can then receive the index and section messages, and determine from them which user devices have messages on hold. In other embodiments, the base station may transmit the index and section data in a higher modulation scheme, such as 16QAM or 256QAM for example. In that case, the base station may determine the modulation state of each transmitted message element according to some number of consecutive index or array elements. For example, four consecutive values are modulated for 16QAM, or eight consecutive values for 256QAM modulation, treating each array element as a binary bit. The user devices can then receive the index and section messages, demodulate the detected signals, and determine from them which user devices have messages on hold.

In other embodiments, instead of modulating the index and section messages, the base station may transmit the 1 values by transmitting a signal, and may indicate the 0 values by transmitting no signal, that is, an on-off modulation. Since most of the index values and array values are usually 0, the base station may save energy and reduce electromagnetic backgrounds by transmitting signal energy only for the 1 values. To do so, the transmitter would have to turn on and off rapidly according to the 1 values being transmitted, but base station transmitters are typically quite capable of handling that stress. The user devices can then receive the index and section messages with the on-off modulation, and determine from the timing of each bit transmission which user devices have messages on hold.

In other embodiments, the base station may accumulate some number of consecutive values of the polling array, and then transmit a modulated polling message according to a higher modulation scheme. For example, the base station may accumulate four consecutive values of the array and determine a modulation state in 16QAM. In addition, as an option, the base station may transmit no signal if all four of the consecutive values are zero. As a further alternative, the base station may select a modulation state based on eight consecutive values according to 256QAM, or other number based on the modulation scheme in use. The user devices can then detect the transmitted modulation states, and determine from them which user devices have messages holding.

An advantage of broadcasting the index and section messages may be that reduced-capability user devices may be able to receive and process the information, and determine whether they have a message holding, using low-complexity mathematical and logical operations, while avoiding complex or compute-intensive calculations involving large memory requirements or high speed calculations, which simpler low-cost task-oriented devices may be unable to perform. An advantage of cascaded polling messages may be that the amount of information transmitted is typically far smaller than the entire array, yet informs each user device whether it has a message holding. Another advantage may be that the user devices that have messages can request those messages by transmitting a short signal at a predetermined time and frequency based on the section messages, thereby greatly simplifying the request process and saving further time and resources. Another advantage may be that the user devices that do not have an incoming message may determine that fact early, such as upon receiving the index values and determining that their section has a 0 value, in which case those user devices can save energy by avoiding receiving and analyzing the subsequent section messages. Another advantage may be that most of the values in the index and the section messages are 0 and thus may be represented by a lack of signal transmission, with signals being transmitted only in the few entries having the non-zero value, thereby minimizing electromagnetic background and interference with other neighboring cells.

Another advantage may be that the procedures of FIGS. 1A and 1B may be implemented as a software (or firmware) update, without requiring new hardware development, and therefore may be implemented at low cost, according to some embodiments. The procedures of FIGS. 1A and 1B may be implemented as a system or apparatus, a method, or instructions in non-transient computer-readable media for causing a computing environment, such as a user device, a base station, or other signally coupled component of a wireless network, to implement the procedure. Another advantage may be that the depicted low-complexity procedures may be compatible with devices that may have difficulty complying with prior-art registration procedures. Other advantages may be apparent to one of ordinary skill in the art, given this teaching. The advantages listed in this paragraph are also true for other lists of advantages presented for other embodiments described below.

Figure 2A:
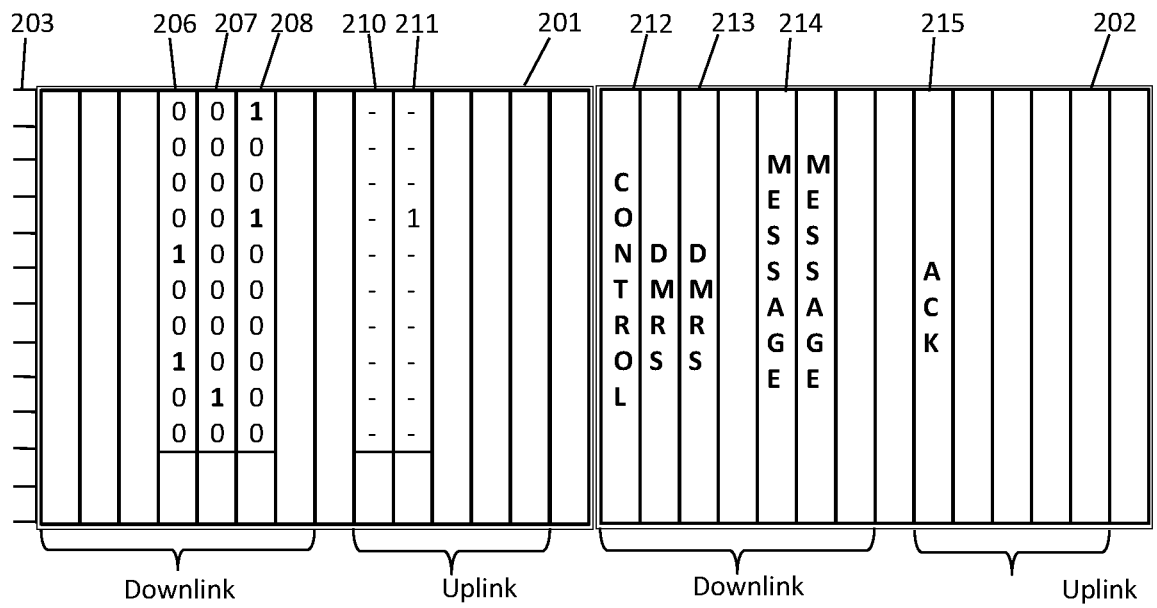
FIG. 2A is a schematic showing an exemplary embodiment of a resource grid populated with cascaded polling messages and responses, according to some embodiments.

FIG. 2A is a schematic showing an exemplary embodiment of a resource grid with a cascaded polling message and replies, according to some embodiments. As depicted in this non-limiting example, a resource grid includes a first slot 201 and a second slot 202. Each slot has 14 symbol-times and 12 subcarriers 203. The slots are divided into scheduled downlink regions, scheduled uplink regions, and unscheduled symbol-times between each scheduled uplink and downlink region. The unscheduled symbol-times may accommodate user devices needing time to switch between receive and transmit mode.

The first slot 201 includes an index message 206, followed by two section messages 207 and 208. The index message 206 is all zeroes except a 1 in the fifth and eighth index values, thereby indicating that only the fifth and eighth sections include messages on hold. The fifth and eight sections of the array are then transmitted as the section messages 207 and 208. The 207 section message, showing the fifth section of the array, thereby corresponds to the fifth index value which is a 1, and likewise the eighth index element is a 1, corresponding to the other section message 208 which shows the eighth section of the array.

The transmitted section messages 207, 208 show the array sections that include at least one message alert value, that is, a 1 in the associated array element. For example, in the first section message 207, there is a 1 in the ninth position, indicating that a first user device associated with that array element has a message. In the second section message 208, there is a 1 in the first and fourth positions, indicating that a second and a third user device have messages waiting. The section messages 207, 208 thereby indicate that the three user devices have messages on hold.

Two uplink reply symbol-times, 210 and 211, are provided for the user devices to request that their messages be downloaded. A signal transmitted by a user device in the uplink reply region is indicated by a 1 at a particular symbol-time and subcarrier. A dash "-" in a particular resource element indicates that none of the user devices transmitted any signal at that symbol-time and subcarrier frequency.

In the depicted example, the size and shape of the uplink reply region matches that of the section messages. This may provide a simple way for the user devices to request their messages with low energy expenditure and low complexity. For example, each user device can determine, from the index and section messages, that it has a message waiting, and then can transmit a signal in the allocated uplink response region, at a time-frequency position corresponding to its 1 indicator in the section messages. That uplink reply signal thereby informs the base station that the user device is ready to receive its message. The other user devices, which have received a 0 in either the index at their section number, or in the section message at their position, may thereby determine that they do not have messages waiting, and therefore may transmit nothing during the uplink reply region. In addition, some user devices may still be asleep, and therefore would transmit nothing. The base station can monitor the uplink reply signals and determine which user devices request their messages, and then can transmit the messages upon a subsequent scheduled downlink interval.

The uplink reply signal may be any electromagnetic signal at the allocated subcarrier frequency. The base station may be configured to accept any signal modulation or type as being a request for transmission of the associated message. This flexibility may enable multiple user devices to transmit their uplink signals during the uplink reply region, without conflict or contention or mutual interference, since each uplink signal is transmitted on a different subcarrier or symbol-time.

In the depicted case, the first user device is associated with the ninth position in the fifth section 207, but was still asleep or otherwise occupied during the polling messages, and therefore it did not transmit a signal at its ninth position in the uplink reply region symbol-time 210. The second user device, associated with the first position in the eighth section 208, was also unavailable and therefore did not transmit a signal in its first position of the second uplink reply region symbol-time 211. However, the third user device, associated with the fourth position of 208, was awake and received a 1 in its array position, which indicates that the third user device has a message waiting. The third user device therefore transmits a 1 signal in its uplink reply position, the fourth position of the second symbol-time 211 in the uplink reply region, corresponding to the same position of its 1 value in the section message 208.

The base station monitors the uplink reply region and receives no signal responses during the first symbol-time 210. During the second reply symbol-time 211, the base station detects the lone positive signal and determines which user device requests its message according to the timing and frequency of that signal. The base station therefore arranges to download the third user device's message In the second slot 202, the first symbol-time may be reserved for downlink control information 212, followed by two symbol-times 213 for DMRS, although these rules are not iron-clad. In this case, the base station downloaded the third user device's message 214 in the fifth and sixth symbol-times during a scheduled downlink interval. The message 214 was modulated in a modulation scheme, such as 16QAM or 256QAM, according to the modulation of the DMRS 213 as the local demodulation reference. The user device receives the message 214 and transmits an acknowledgement 215 in the next uplink scheduled interval which is a few symbol-times later.

In this example, the base station has indicated which user devices have messages on hold, and one of them indicated readiness to receive its message, which the base station then downloaded to the waiting user device. The other two user devices with messages on hold were asleep, but they may respond to another polling session at a later time. Advantageously, low-complexity procedures were provided to allow the user devices to minimize their energy consumption.

Figure 2B:
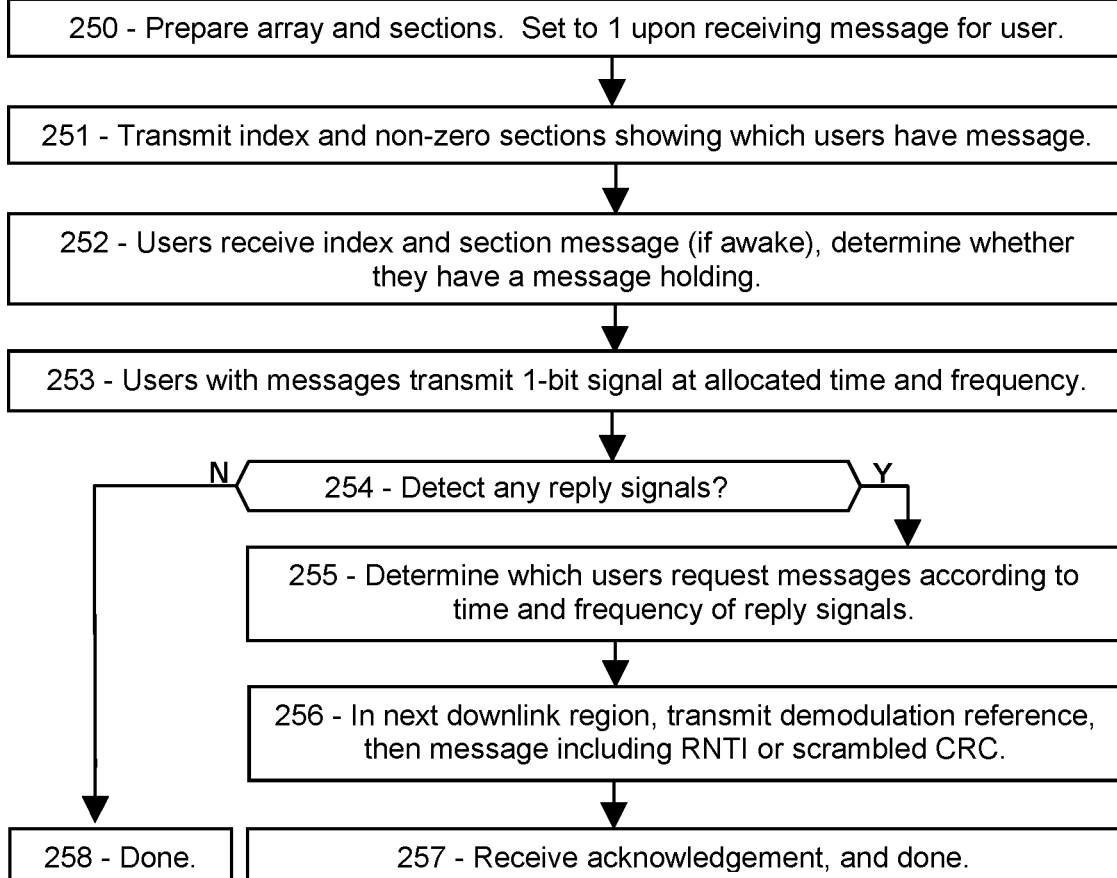
FIG. 2B is a flowchart showing an exemplary embodiment of a method for user devices to receive their incoming messages, according to some embodiments.

FIG. 2B is a flowchart showing an exemplary embodiment of a method for user devices to receive their incoming messages, according to some embodiments. As depicted in this non-limiting example, at 250 a base station of a network can prepare a polling array, with one array element per user device in the network, and can divide the array into sections. The base station can set the array elements to 0 initially. Upon receiving an incoming message addressed to a particular user device, the base station can set the array element associated with that user device to a 1, thereby indicating that the base station is holding an incoming message for the particular user device.

At 251, the base station can periodically, or on some other schedule known to the user devices, broadcast a polling message. To do so, the base station may first prepare an index containing index elements, one index element per section of the polling array. The base station can set the index elements according to their associated sections. If a particular section is all 0's, then the associated index element can be set to 0. If any of the section elements is a 1, the associated index element can be set to a 1. Thus the index message can indicate which sections include user devices that have incoming messages on hold. The base station can then transmit the index message, followed by each section message that includes at least one incoming message on hold. Thus the polling message includes the index followed by each non-zero section of the array, broadcast on a downlink channel that the user devices can receive.

At 252, each user device (if awake) can receive the polling message and check the index element corresponding to that user device's section number. If that index element is 0, the user device can conclude that it has no messages on hold, and may take no further action in this example. If the index element corresponding to the user device's section is a 1, then the user device can read the associated section message, and can determine that the section element associated with that user device is a 1, meaning that the user device has an incoming message on hold. In that way, the user device can receive and analyze the appropriate section message, and check whether the array element corresponding to that user device's position in the array is a 0 or 1. If it is a 0, the user device can conclude that it does not have an incoming message on hold, and therefore may take no further action. If it is a 1, the user device knows that it has an incoming message on hold.

At 253, each user device that has an incoming message on hold may wait for an allocated uplink reply region, and may determine, from the 1's in the index message, which symbol-time in the uplink reply region corresponds to that user device's section. Then, in that symbol-time, the user device can transmit an uplink signal at the same subcarrier frequency as the user device's section element. The user device may thereby request transmission of its incoming message on hold. The uplink signal may have any modulation, in this example, as long as it is confined to the subcarrier and symbol-time corresponding to the user device's section and array position. The base station may be configured to interpret any such signal as a download request. Alternatively, the uplink signal may have a modulation that does not depend on precise demodulation, such as BPSK or QPSK, and may thereby convey additional 1 or 2 bits of information in its reply message.

At 254, the base station determines whether it has detected any uplink reply signals in the uplink reply region. If not, the base station may conclude that none of the user devices is ready to receive their messages on hold, and is done at 258. If the base station detects a reply signal, then at 255 the base station can determine which user or users have requested their messages according to the symbol-time and subcarrier frequency of those uplink reply signals.

At 256, the base station transmits the requested message or messages to the requesting user devices. Typically such message transmissions employ higher-order modulation than the control-type messages, and therefore may be accompanied by a demodulation reference such as a DMRS, or alternatively a short-form demodulation reference (described below). The base station may transmit the user device's incoming message using that modulation. In addition, the base station may identify the recipient by including the address or identification code, such as the RNTI code, of the recipient user device in the downlink message. Alternatively, the base station may include a CRC error code, scrambled by the RNTI, or otherwise addressed to the intended user device. The base station then receives an acknowledgement at 257, resets the associated array element to 0, deletes the incoming message on hold, and is done.

FIG. 3A is a schematic showing an exemplary embodiment of a resource grid including a polling message and user device responses, according to some embodiments. As depicted in this non-limiting example, a base station maintains a polling array of one-hundred array elements, divided into ten sections, each section including ten section elements. Each array element, and the corresponding section element, is associated with one user device, respectively. The base station sets the array elements to 0 initially, and to 1 upon receiving an incoming message addressed to the user device that is associated with the array element.

The resource grid 301 includes 14 symbol-times and multiple subcarriers 303. Intervals are scheduled for downlink and uplink as shown. A polling message 302 is shown in the fourth symbol-time. The polling message is frequency-spanning across multiple resource blocks. The polling message 302 includes an index message 306, outlined in bold. The index message 306 includes two 1's, which are in the fifth and eighth index elements, and the rest are 0's. The index message 306 thus indicates that the fifth and eighth sections of a polling array have incoming messages on hold, and the rest of the sections have no messages on hold.

The polling message 302 continues with two section messages 307, 308 outlined in bold. One section message 307 shows the fifth section of the polling array, as indicated by a curvy dashed arrow, and the other section message 308 shows the eighth section of the polling array, as indicated by another curvy dashed arrow. The section messages 307, 308 thereby correspond to the 1's in the index message 306.

The first section message 307 includes a 1 in the ninth position, indicating that the ninth position of the fifth section of the polling array is a 1, which indicates that a first user device 321, associated with that array value, has an incoming message on hold. The other section message 308 includes a 1 in the first and fourth positions, thereby indicating that a second user device 322 (associated with the first position of the eighth section) and a third user device 323 (associated with the fourth position of the eighth section) also have incoming messages on hold.

The user devices can receive the polling message 302, and can demodulate each of the subcarrier signals therein, and can thereby determine the distribution of 1's and 0's in the polling message 306. The user devices can read the first ten values which make up the index message 306, and can thereby find the 1's in the fifth and eighth index elements, and thus determine that the fifth and eighth sections of the polling array include incoming messages on hold. Any user device not belonging to the fifth or eighth section may then cease processing at that time, since the index message indicates that those user devices have no incoming messages on hold. Any user device belonging to the fifth or eighth section can then refer to the appropriate section message 307, 308 to determine whether it has an incoming message on hold.

User devices in the fifth section can interpret the array elements in the section message 307, and find a 1 in the ninth position, which indicates that a first user device 321, associated with the ninth position of the fifth section of the polling array, has an incoming message on hold. The others are zero, indicating that they do not have messages.

Likewise, the user devices in the eighth section can interpret the array values in the section message 308, and find a 1 in the first and fourth positions. This section message 308 thus indicates that a second user device 322, associated with the first position of the eighth section of the polling array, has an incoming messages on hold, and also that a third user device 323, associated with the fourth position of the eighth section, also has an incoming message on hold.

The base station has allocated an uplink reply region in the first uplink-scheduled symbol-time, consisting of a first uplink reply region 310 and a second uplink reply region 311, both outlined in bold. The user devices can indicate their readiness to receive their messages by transmitting a signal at the allocated frequency within the frequency-spanning uplink reply messages 310, 311. Transmissions in the uplink reply messages 310, 311 are depicted as a 1 for any transmitted signal, or a dash "-" for silence or no signal.

The first and second user devices 321, 322, associated with the ninth position of the fifth section 307, and the first position of the eighth section 308, are still asleep, or otherwise occupied, when the polling message 302 is transmitted, so they do not reply, and their corresponding positions on the uplink reply region 310, 311 are null. The third user device 323, however, received the polling message 302, determined according to the index message 306 and its section message 308, that it has an incoming message on hold, and therefore transmitted a signal in the fourth position of the reply message 311, as indicated by a solid arrow.

The base station can receive the reply messages 310 and 311, determine that no signals are present in the first uplink reply message 310 which indicates that the first user device 321 is not ready to receive its message. The base station can determine, from the second uplink reply message 311, that the second user device 322 was also asleep, but that the third user device 323 was awake and now requests its message. The base station can then download the third user device's message, set the associated entry of the polling array back to 0, and is done.

Figure 3B:
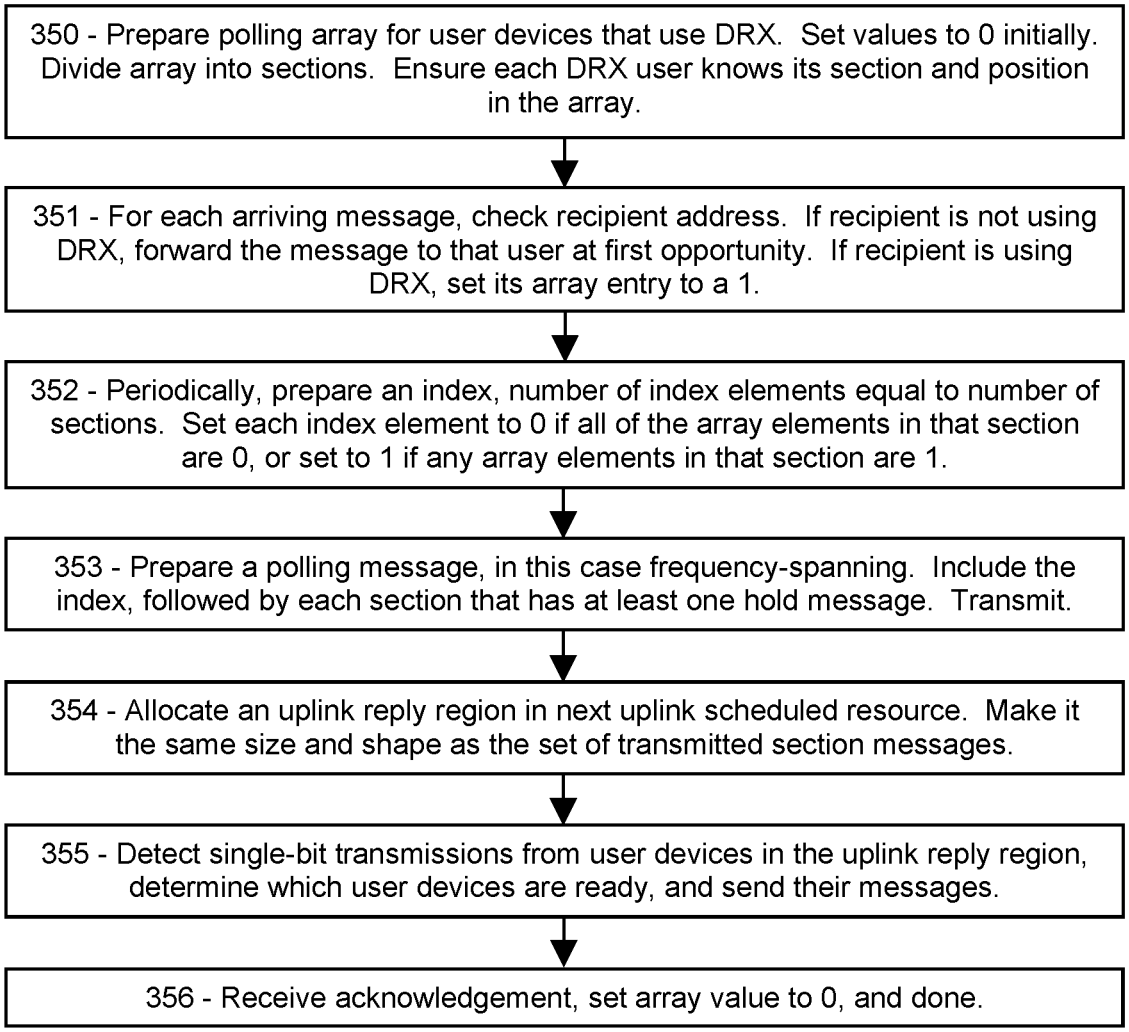
FIG. 3B is a flowchart showing an exemplary embodiment of a process for base stations to inform user devices of holding messages, according to some embodiments.

FIG. 3B is a flowchart showing an exemplary embodiment of a process for base stations to inform user devices of holding messages, according to some embodiments. As depicted in this non-limiting example, at 350 a base station can prepare, in memory, a polling array of array elements, one array element for each user device that employs DRX. The base station sets the array elements to 0 initially, and divides the array into sections. The user device may have informed the base station of its intent to use DRX in, for example, an initial access message, such as Msg3 of the random-access procedure. The base station may then inform the DRX user of its array address in the polling array, in Msg4 of the initial access procedure, or an RRC message, or other message.

At 351, the base station receives an incoming message addressed to a particular user device. The incoming message may be uploaded from within the same cell, or it may have been transferred from a remote location by multi-hop transfer, or otherwise. The base station determines, from the message address, that it is intended for the particular user device. If the particular user device is a DRX user, then the base station sets its associated array element to a 1 and holds the incoming message in preparation for a later polling session. If the array element is already set to 1, meaning that the particular user device already has another incoming message on hold, then the base station may concatenate the two messages, or it may store the second message for transfer after the first message has been downloaded, or it may reject the second message, or other action depending on network rules.

If the particular user device is not a DRX user, the base station may attempt to download the incoming message to the particular user device instead of holding the message for a polling session. However, if that download attempt fails, and the base station receives a NACK from the particular user device, or fails to receive any acknowledgement after attempting to download, then the base station may try again. In some embodiments, after one or some number of failed download attempts, the base station may add the particular user device to the polling array and hold the incoming message until the next polling session, or it may take other action depending on network rules.

At 352, on a predetermined schedule such as periodically, or at-will, or on demand, the base station may prepare an index based on the polling array, with each index element equal to the logical OR of the elements in the associated section. The index thereby indicates which sections have at least one incoming message on hold.

At 353, the base station may prepare a polling message including the index and whichever sections of the polling array have at least one incoming message on hold. The base station then transmits the polling message, either as a single frequency-spanning message in one symbol-time, or as a sequence of frequency-spanning messages including the index message and each section message in sequential symbol-times, for example.

At 354, if not sooner, the base station allocates an uplink reply region which, in this case, has the same time-frequency configuration as the section messages. Hence the user devices can indicate their readiness to receive their messages on hold by transmitting a signal in their associated positions in the uplink reply region.

At 355, the base station monitors the uplink reply region and detects any signals transmitted therein. The base station determines, from the time and frequency of each uplink signal, which user device requested its message. The base station then downloads the requested message in the next scheduled downlink interval. Upon receiving a positive acknowledgement at 356, the base station sets the associated array element to 0, deletes the transmitted message, and is done. If, however, the base station receives a NACK or fails to receive an acknowledgement at all, then the base station can either try again, or wait for the next polling session to download the message, or delete the message if a maximum repetition limit has been reached, or other action depending on rules.

Figure 4A:
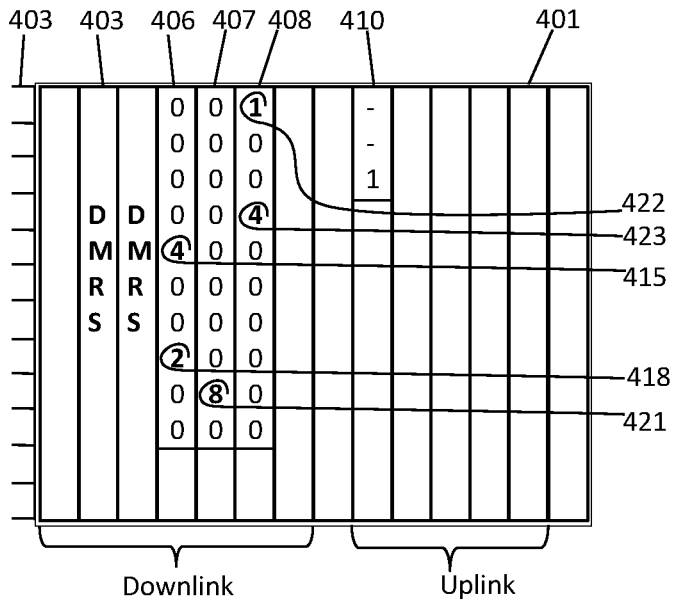
FIG. 4A is a schematic showing an exemplary embodiment of a resource grid including modulated polling messages, according to some embodiments.

FIG. 4A is a schematic showing an exemplary embodiment of a resource grid including modulated polling messages, according to some embodiments. Here the polling array has 1600 array elements, divided into 40 sections, each section with 40 section elements. However, the messages take up much less space in the resource grid due to the 4:1 compaction from the modulation. As depicted in this non-limiting example, a resource grid 401 with subcarriers 403 includes a downlink region and an uplink region as indicated. In the resource grid 401 is a DMRS 403, followed by a modulated index message 406 and two modulated section messages 407, 408. Subsequently, there is an uplink reply region 410.

In this example, the base station has modulated the index message and the section messages according to a modulation scheme such as 16QAM or 256QAM, for example. The intent is to take up less space in the resource grid than the "0-or-1" modulation of the previous examples. The user devices can demodulate the messages according to the DMRS 403, to recover the index values and the section values.

Also in this example, the uplink reply region 410 is now very brief. It includes just a small number of resource elements, equal to the number of user devices that have incoming messages on hold. Each user device can indicate its readiness to receive the message by transmitting a brief signal in the uplink reply region 410 at its particular subcarrier according to the order of notification of the user devices in the section messages 407, 408.

The polling session begins with a DMRS 403 which enables user devices to demodulate the rest of the messages. The index message 406 includes message elements modulated according to 16QAM in this case, which includes four bits per message element. Each modulated message element includes a cluster of four consecutive array values, each being 0 or 1, treated as bits. The 16QAM modulated message elements may then be represented as a hexadecimal value from 0 to F (or 0 to 15 in decimal). In most cases, however, only one bit in the cluster of four array elements has a message waiting, due to the low number of holding messages in most cases. Therefore, the hexadecimal value is most likely to be 0 if none of the four array elements has a message on hold, or either 1, 2, 4, or 8 if one of the four array elements has a message on hold. The modulated values of 0, 1, 2, 4, and 8 in hexadecimal represent 0000, 0001, 0010, 0100, and 1000 in binary.

In the depicted example, the index message 406 includes ten index elements, each index element representing four sections of the polling array. Thus the ten index elements represent 40 sections in the polling array. Modulating with 16QAM provides a compaction factor of four, due to four bits per modulated message element.

In the depicted example, the index message 406 includes two non-zero index elements 415 and 418, which are in positions five and eight, thereby indicating that those two of the sections of the polling array have messages. Then, in the next two symbol-times, the section messages 407 and 408 are transmitted, each having ten section elements modulated in the same way, and therefor representing 40 array values in each section. The polling array then has a total of 40×40=1600 array values. Yet, the entire polling message occupies only 30 resource elements, due to the modulation compaction.

The section messages 407 and 408 indicate three user devices that have messages holding. The first user device 421 is indicated by the 8 in the first section message 407, the second user device 422 is indicated by the 1 in the second section message 408, and the third user device 423 is indicated by the 4 in the second section message 408. As mentioned, these modulation values of 1, 2, 4, and 8 each represent four array elements, of which just one array element is usually a 1 due to the sparse population of the messages on hold.

The resource grid 401 also includes an uplink reply region 410 for the polled user devices to request their messages. In this example, the uplink replies are single-bit signals transmitted by the replying user devices, the uplink replies transmitted in the same order as the user devices are indicated in the section messages 407 and 408. Specifically, the first, second, and third user devices 421, 422, 423 are mentioned in that order, and the uplink reply signals are to be placed in the same order on the subcarriers of the uplink reply region. The first-indicated user device having a message on hold, which is 421, is to transmit its reply signal in the first subcarrier of the uplink reply region 410, and the second-indicated user device 422 can transmit on the second subcarrier, and the third-indicated user device 423 can transmit on the third subcarrier. Thus the order of reply signals in the uplink reply region 410 is the same as the order of user devices indicated in the section messages as having an incoming message on hold; first goes to first, second to second, and so forth.

In this example, the first user device 421 is asleep during the polling session and therefore fails to transmit a signal in the first position of the uplink reply region 410, which is marked as silent ("-"). The second user device 422 is also asleep. The third user device 423 is awake, and receives the polling messages 406, 407, 408. The third user device 423 responds by transmitting a signal ("1") in the third subcarrier of the uplink reply region 410 (since it is the third-indicated user device in the section messages). Subsequently, the base station determines, according to the signal in the third subcarrier, that the third-mentioned user device requests its message on hold, determines which message on hold is associated with that third user device, and downloads that message to the third user device 423.

An advantage of modulating the index and section messages in 16QAM or other modulation scheme may be to reduce the amount of resource elements used. An advantage of the user devices providing their reply signals according to the order of mention in the section messages, may be to further reduce resource usage, since the base station then only needs to allocate an uplink reply region with the same number of resource elements as the number of user devices that have messages on hold, which is generally a small number. In the depicted case, the uplink reply region uses only three resource elements because only three user devices have incoming messages on hold.

Figure 4B:
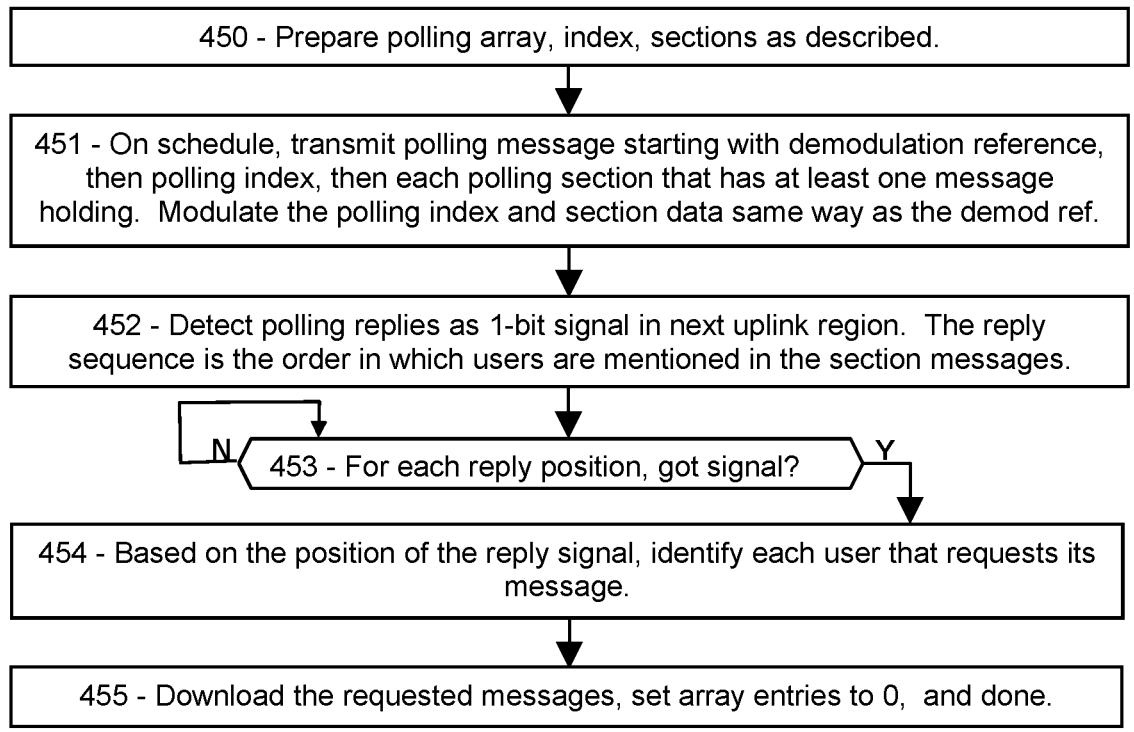
FIG. 4B is a flowchart showing an exemplary embodiment of a method for base stations to provide modulated polling messages, according to some embodiments.

FIG. 4B is a flowchart showing an exemplary embodiment of a method for base stations to provide modulated polling messages, according to some embodiments. As depicted in this non-limiting example, at 450 a base station prepares a polling array in memory, divides the polling array into sections, and prepares an index indicating whether each section has any messages waiting. At 451, the base station, on a predetermined schedule, transmits the polling message modulated in a modulation scheme, such as 16QAM. First a demodulation reference such as a DMRS, or other demodulation reference, is transmitted, followed by the index message and the section messages indicating which user devices have messages on hold. The user devices receive and demodulate the index message and thereby determine how many sections will be transmitted, and which ones. The user devices then receive and demodulate the section messages and determine which user devices have incoming messages on hold. Each of the user devices that have a message on hold can determine, according to the section messages, how many other user devices precede it (that is, are mentioned in the section messages before that user device), and can thereby determines its own position in the uplink reply region. For example, the user device which is indicated first in the section messages will reply in the first resource element of the uplink reply region, and the user device mentioned second will reply in the second uplink reply position, and so forth for all of the user devices that are indicated as having messages on hold.

At 452, the base station monitors the uplink reply region and detects any uplink reply signals at 453. For each uplink reply signal, at 454 the base station determines which user device is requesting its message according to the order of user devices indicated in the section messages, and at 455 the base station downloads the requested message or messages. Upon receiving a positive acknowledgement, the base station resets the associated polling array element to 0.

FIG. 5A is a schematic showing an exemplary embodiment of a resource grid including a modulated polling message, according to some embodiments. As depicted in this non-limiting example, a compact messaging arrangement may result in saving further resources. Here a large polling array of, say 65,536 array elements can accommodate a large network, with 256 sections, each section with 256 user devices. In this example, the index message lists only the non-zero section numbers, instead of showing all of the sections as in the previous examples. Since the index elements are (usually) mostly 0, the base station can save resources and time by listing only the sections that have incoming messages on hold, in some embodiments. In addition, for further savings, the section messages list just the non-zero array positions, instead of showing the entire section of the array as in the previous examples. Listing only the non-zero array elements by address may save additional resources, in some embodiments. The messages may be modulated in a modulation scheme, such as 16QAM, for further compaction in some embodiments. The user devices may then transmit uplink reply signals in an allocated uplink reply region, selecting their subcarriers according to the order by which they were mentioned in the section messages.

The depiction includes a resource grid 501 with subcarriers 503. An index message 506 and two section messages 507, 508 are shown, followed by an uplink reply region 510. The index message begins with a short-form demodulation reference "DR" in this case (as explained below). The index message 506 then indicates the number "NS" of sections that have a message waiting. The number NS is depicted as occupying two resource elements, which are sufficient to specify up to 256 sections at 16QAM with 4 bits per resource element, thereby matching the array size of the previous example. In the present example, NS=2, that is, two sections have user devices with messages waiting. Those two sections are then specified as "Sa" and "Sb", standing for the two sections, Section-a and Section-b. Those section values are depicted as occupying two resource elements, thereby accommodating up to 256 sections in the array, as in the previous example.

The example then shows two section messages 507 and 508. These sections were specified in the index message 506 as Sa and Sb, as indicated by dashed curvy arrows. Each section message 507, 508 specifies the number ("Na" and "Nb") of user devices that have messages on hold, in each section. The section messages 507, 508 then list the positions of those user devices as "a1", "a2", and "a3" within Section-a, and "b1" and "b2" in Section-b. More specifically, the first section message 507 indicates the number of user devices listed in that section as "Na", meaning "the number of user devices with messages holding in Section-a". In this case, Na is three, since there are three user devices in Section-a with messages on hold. Those user devices are then listed as "a1", "a2", and "a3" referring to the first, second, and third user device. The three values thereby show the positions of those three user devices within Section-a. Since the section number has already been specified, as "Sa" in the index message 506, it is sufficient to specify just the position of the user devices within that section, as opposed to the full array address. Likewise, the fourth and fifth user device with messages waiting can be specified as "b1" and "b2" in the second section message 508, again indicating just the user device's position within Section-b. The full array address would take four resource elements at 16QAM, but the position within the section can be specified with just two resource elements, as depicted. As depicted, the section numbers Sa and Sb, ranging from 0 to 255, are specified in two resource elements of the index message 206, and the position of each user device, such as a1 and a2 and so forth, within the section messages 507, 508 are specified as the position within the section, again ranging from 0 to 255 in two resource elements.

To be more specific, if the first user device is at position 17 within Section-a, then "a1" would equal 17 (starting at zero for the beginning of the section). The array address of the first user device then equals the starting address of Section-a plus the position value shown. The positions of the user devices are specified in two resource elements, in this depiction, thereby specifying up to 256 user devices per section. Thus the "Na" entry in 507 specifies how many user devices in Section-a have messages, and the subsequent entries "a1" and so forth, specify the positions of those user devices within that section. The second section message 508 continues in a similar way to specify the number of user devices in Section-b with messages ("Nb"), followed by the positions of those user devices in that section. In this case, Nb equals two, and those two user devices are termed the fourth user device at position b1, and the fifth user device at position b2 within Section-b. Cascading the addresses in this way avoids specifying anything explicit about the sections that have no messages on hold, and thereby reduces resource usage, according to some embodiments.

User devices can receive the index and section messages 506, 507, 508 and determine whether their section is among those listed in the polling index 506, and if so, the user devices can determine whether their position within that section is listed in the section message 507 or 508, and if so, the user devices can then request their messages. In this example, the user devices can request their messages by transmitting a single 1-bit signal in the uplink reply region 510, at a subcarrier corresponding to the order in which each user devices was named in the section messages 507, 508. For example, the first-listed user device, "a1", can request its message by transmitting a signal in the first position 511 of the uplink reply region 510. Likewise, the second, third, fourth, and fifth user devices (listed in that order by the section messages) can transmit their signals at the corresponding positions 512, 513, 514, and 515 of the uplink reply region 510, that is, the order of subcarriers in the uplink reply region corresponds to the order that the user devices are listed in the section messages.

In the depicted example, the first user device "a1" is still asleep during the polling message, and therefore does not transmit a signal at its position (the first position 511) of the uplink reply region 510, as indicated by a dash "-" in that position. The second user device "a2" is ready, detects its section address "a2" in the first section message 507, determines thereby that it has an incoming message on hold, and transmits a signal at its position (the second position 512), as indicated by the "1" in that position. The third user device is asleep and does not transmit anything at its position 513, but the fourth and fifth user devices are awake and transmit their signals at the fourth and fifth positions 514, and 515.

The base station can monitor the uplink reply region 510 and detect the signals 512, 514, 515 therein, as well as the silent positions 511, 513. The base station can determine which user device transmitted which signal according to the order of the subcarriers of the uplink reply region 510. For example, the base station can determine that the second user device "a2" transmitted a signal 512 on the second subcarrier, and can determine therefore that the second user device wants its message. In a similar way, the base station can determine, according to signals 514, 515 in the fourth and fifth positions, that the fourth and fifth user devices request their messages. The base station then transmits those requested messages when convenient, and resets the associated array values back to zero. The other two user devices which did not transmit signals at 511 and 513, may subsequently wake up and respond to a later polling message to get their messages.

An advantage of specifying the number of sections in the index message, followed by their section numbers, may be to reduce the amount of resources in the index message. An advantage of specifying the number of user devices in each section message, followed by the positions of those user devices in that section, may be to reduce the amount of resources in the section messages. An advantage of modulating the polling message may be to reduce the amount of resources in the polling message. An advantage of providing an uplink reply region in which the polled user devices can transmit a single-bit signal, may be to reduce the amount of resources used in the uplink reply region. In this example, a large array of 65,536 user devices can be accommodated with DRX message service, using only 27 resource elements, including the uplink reply region.

In an alternative embodiment, the base station may transmit the index message 506 and the section messages 507, 508 at the same symbol-time, that is, frequency-spanning on sequential subcarriers, instead of transmitting the section messages in sequential symbol-times as depicted. In some embodiments, the polling message may include a final short-form demodulation reference after the last section message, to provide updated modulation levels at both ends of the transmission. In some embodiments, the base station may specify where the uplink reply region is, for example by specifying a number of symbol-times following the polling message, where the uplink reply region begins.

The short-form demodulation reference in this example is a compact demodulation reference that is generally shorter than the full DMRS, but conveys sufficient information to enable receivers to demodulate the rest of the message. For example, the short-form demodulation reference may include two resource elements, one modulated according to the maximum levels of the modulation scheme, and the other modulated according to the minimum levels of the modulation scheme. The user devices can then interpolate between those exhibited modulation levels to determine any intervening modulation levels. The modulation levels thus determined include noise and interference. When those levels are used to demodulate the rest of the message, the updated modulation levels can mitigate most types of distortion and reduce message faults, according to some embodiments.

FIG. 5B is a flowchart showing an exemplary embodiment of a process for broadcasting a modulated polling message, according to some embodiments. As depicted in this non-limiting example, at 550 a wireless network includes a base station and a number of user devices, at least some of which employ DRX to save energy. The base station sets up a polling array, one array element for each user device (or alternatively, one array element for each potential user device, based on the maximum number of user devices that the base station can manage). The base station divides the polling array into sections and initially sets all the array elements to 0. Whenever the base station receives an incoming message addressed to one of its user devices, it sets the associated array element to 1. The base station then holds the incoming message until it can be delivered.

At 551, according to a pre-arranged schedule, such as periodically, the base station polls the user devices by transmitting a polling message. In this case, the polling message is modulated according to a modulation scheme. The polling message includes a demodulation reference, an index message, and a number of section messages. The index message indicates how many sections have at least one user device with an incoming message on hold, followed by those section numbers.

At 552, the base station transmits a series of section messages, one section message for each of the sections listed in the index message. Each section message indicates the number of user devices with a message on hold in that section, and then lists the positions of those user devices within that section, that is, relative to the start of the section. In this compact format, the array address of a particular user device equals the section number (as specified in the index message) times the size of each section (as specified in a system information message), plus the particular user device's position (as specified in the section message).

At 553, the base station may allocate an uplink reply region for user devices to request their messages. Each user device specified in the section messages can transmit a signal in the uplink reply region, on a particular subcarrier according to the order that the user devices are listed in the section messages. For example, the user device can count how many other user devices are listed ahead of it in the section messages, assuming one subcarrier per listed user device, and then can transmit its uplink signal on the next subcarrier. (In some embodiments, the user devices may leave a blank subcarrier between the signal messages, to avoid overlap between adjacent signal messages due to timebase or frequency errors, motional frequency shifts, and the like. The base station can then monitor the uplink reply region, detect the particular user device's signal therein, and identify the particular user device according to the subcarrier of the user device's reply signal. Thus each subcarrier of the uplink reply region is associated with one of the user devices listed in the section messages.

At 554, the base station transmits the requested messages to the requesting user devices. Then, upon receiving a positive acknowledgement, the base station can reset the user device's array value back to 0, delete the message, and is done.

Figure 6A:
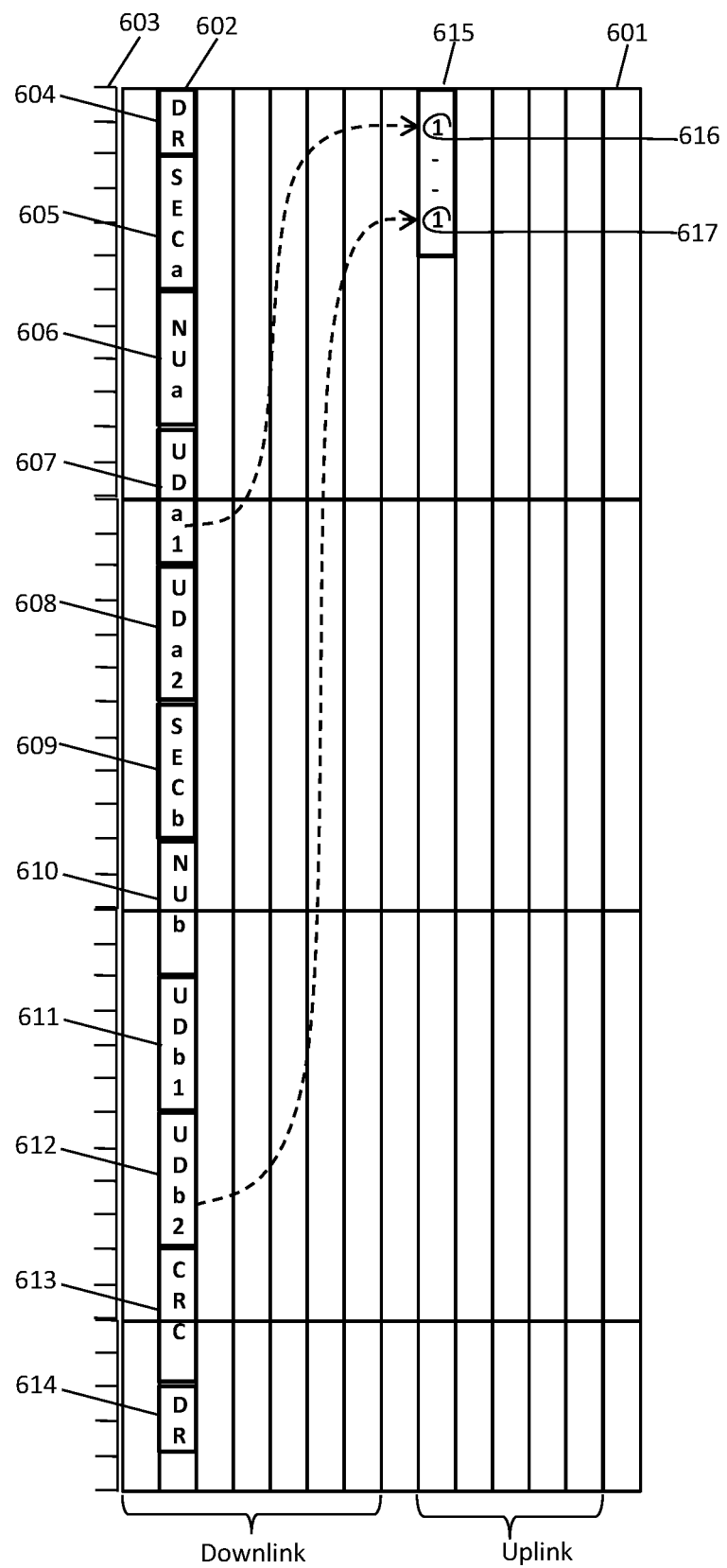
FIG. 6A is a schematic showing another exemplary embodiment of a resource grid including a modulated broadband polling message, according to some embodiments.

FIG. 6A is a schematic showing an exemplary embodiment of a resource grid including a modulated broadband polling message, according to some embodiments. As depicted in this non-limiting example, a base station prepares a polling array in sections and records in the array which user devices have an incoming message on hold. The example depicts a resource grid 601 with subcarriers 603 and a polling message 602 and an uplink reply region 615. The polling message 602 is modulated according to a modulation scheme, and in this case is transmitted frequency-spanning, that is, all in one symbol-time on various subcarriers. The polling message 602 begins with a short-form demodulation reference "DR" 604 occupying two resource elements, followed by a first section number "SECa" 605 ("SECtion-a") specifying a first section that has at least one message on hold, and the number "NUa" 606 ("Number of User devices in Section-a") which have messages on hold. In this case, "NUa" equals two user devices. The polling message 602 then continues by listing the positions of the two user device in the first section that have messages on hold. The first user device with a message on hold is at position "UDa1" 607 ("User Device 1 in Section-a"), and a second user device is at position "UDa2" 608 ("User Device 2 in Section-a") all within the first section. That completes the specification for the first section. The message continues with a second section number "SECb" 609, the number of message holders "NUb" 610 in that section (which also equals two), and their positions "UDb1"

and "UDb2" 611, 612, thereby completing the specification of user devices that have waiting messages. The polling message 602 then includes a CRC error-detection code 613, and a final short-form demodulation reference 614.

User devices receiving the polling message 602 can demodulate it according to the demodulation references 604, 614 and verify the demodulation using the embedded CRC 613. The user devices can then determine whether they have a message on hold by interpreting the section numbers 605 and 609, the number of entries for each section 606 and 610, and the position specifications for each of those user devices 607, 608, 611, 612. The user devices can determine whether they have a message on hold by calculating the array address corresponding to each of the specified values, the array address equal to the position specification plus the section number times the size of each section. Alternatively, each user device can check whether it belongs to each of the named sections, and if so, whether the user device is among the positions listed in that section. By either method, the user devices can determine whether they have a message on hold.

Each user device that has a message on hold can then request its message by transmitting a signal in a particular subcarrier of the uplink reply region 615. The particular subcarrier, for each user device, is determined by the order of position specifications 607, 608, 611, 612 of user devices in the polling message 602. For example, a first-listed user device is "UDa1" 607. Accordingly, the first-listed user device transmits a signal 616 (depicted as a "1") in the first subcarrier of the uplink reply region 615. The correlation between the first-listed user device's position in the polling message and its signal in the uplink reply region is indicated by a curvy dashed arrow. The second and third specified user devices were unavailable in this example, and therefore did not transmit reply signals, as indicated by a dash "-" in the second and third positions of the uplink reply region 615. The fourth-listed user device, "UDb2" 612 transmits a signal 617 in the fourth position of the uplink reply region 615 as indicated by another curvy dashed arrow.

The base station can receive the signals 616 and 617, determine according to the frequency or the subcarrier of each signal 616 or 617, which user device is requesting, and then can download those messages and reset the associated array values to 0.

In the depicted example, it is not necessary to specify the number of sections that have messages, because each user device is uniquely specified by the section and position fields, and the end of the polling message 602 is demarked by the CRC 613 and the final demodulation reference 614. The polling message 602 occupies 40 subcarriers in this example, amounting to a bandwidth of 600 kHz at the lowest numerology. Although many user devices are able to handle that bandwidth, the lowest-capability devices may be limited to a smaller bandwidth. To accommodate such reduced-capability user devices, if present, the base station may break the polling message into two or more portions, and broadcast each portion on successive symbol-times, to remain within the capabilities of the user devices being served.

Figure 6B:
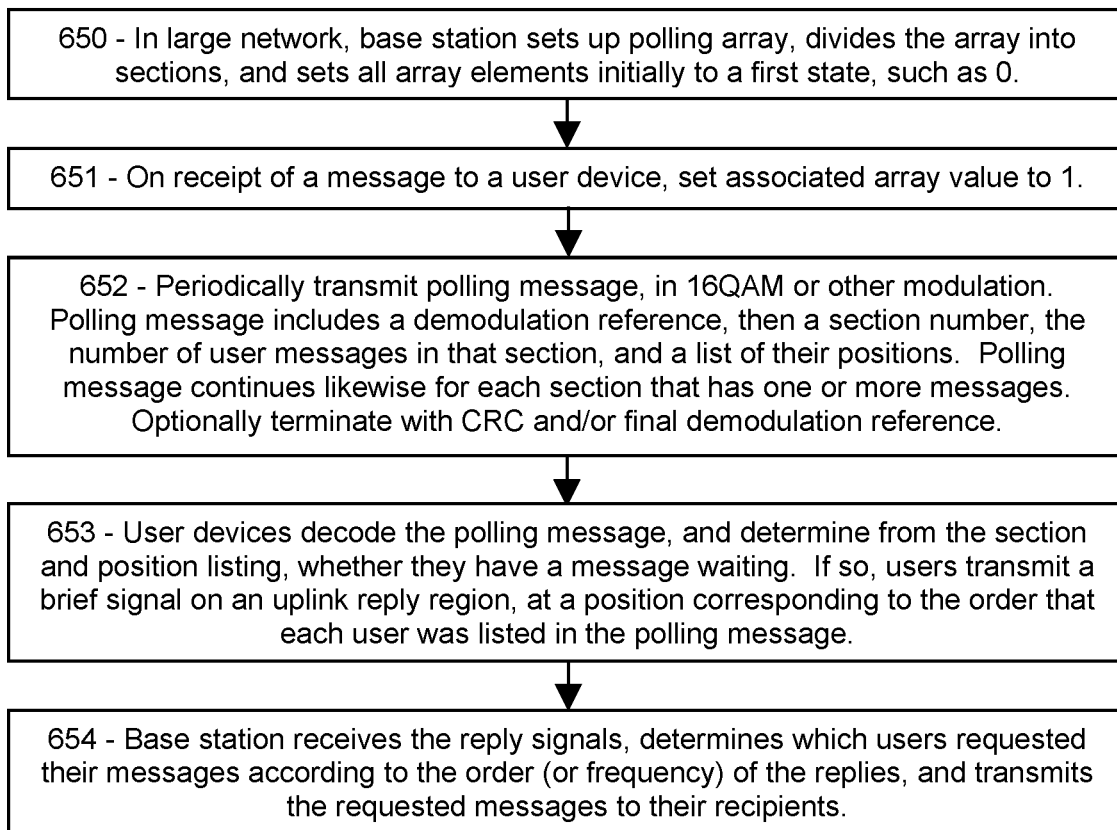
FIG. 6B is a flowchart showing another exemplary embodiment of a process for broadcasting a modulated broadband polling message, according to some embodiments.

FIG. 6B is a flowchart showing an exemplary embodiment of a process for broadcasting a modulated broadband polling message, according to some embodiments. As depicted in this non-limiting example, at 650 a base station of a large network prepares a polling array, with one array element per user device in the network. The base station divides the polling array into sections, and sets all array elements to 0.

At 651, the base station receives an incoming message addressed to one of the base station's registered user devices. If the recipient user device is not a DRX user, then the base station may download the message to the recipient upon the next downlink interval. If the recipient has indicated that it intends to use discontinuous reception, the base station may hold the message and set the associated array element to a 1.

At 652, the base station periodically broadcasts a polling message, modulated in this case by 16QAM or other modulation scheme. The polling message includes a demodulation reference, which may be a DMRS or a short-form demodulation reference, for example. The polling message may include, for each section that has at least one message holding: a section number, a number of user devices that have a waiting message in that section, and then a list of the positions of those user devices within the section. The position may be an address of the user device minus the starting address of the section it is in, that is, the address of the user device relative to the start of its section. Hence the array address of the user device may be calculated as the section number times the size of one section, plus the position of the user device within that section. After specifying all the sections that have messages waiting, including the number of user devices and their positions within their sections, the polling message may conclude with, for example, a CRC or other error-detection code, and optionally another demodulation reference.

At 653, the user devices can receive the polling message, demodulate it according to the demodulation reference, determine each section number, and identify each user device listed in that section having a message on hold. Each user device can thereby determine whether it has an incoming message on hold. The listed user devices can then request their messages by transmitting a short signal in an allocated uplink reply region. The user device can count the number of other user devices named in the polling message ahead of that user device, and thereby determine a position or subcarrier within the uplink reply region in which to transmit a signal. Thus the order of uplink signals is the same as the order of listing of the user devices in the polling message, in this embodiment.

At 654, the base station receives the reply signals and, based on the position or subcarrier of each reply signal, determines which of the specified user devices requests its message. Then, or upon the next downlink interval, or at other appropriate time, the base station can transmit the requested message or messages and, after getting an acknowledgement, can reset the associated elements of the polling array back to 0.

Figure 7A:
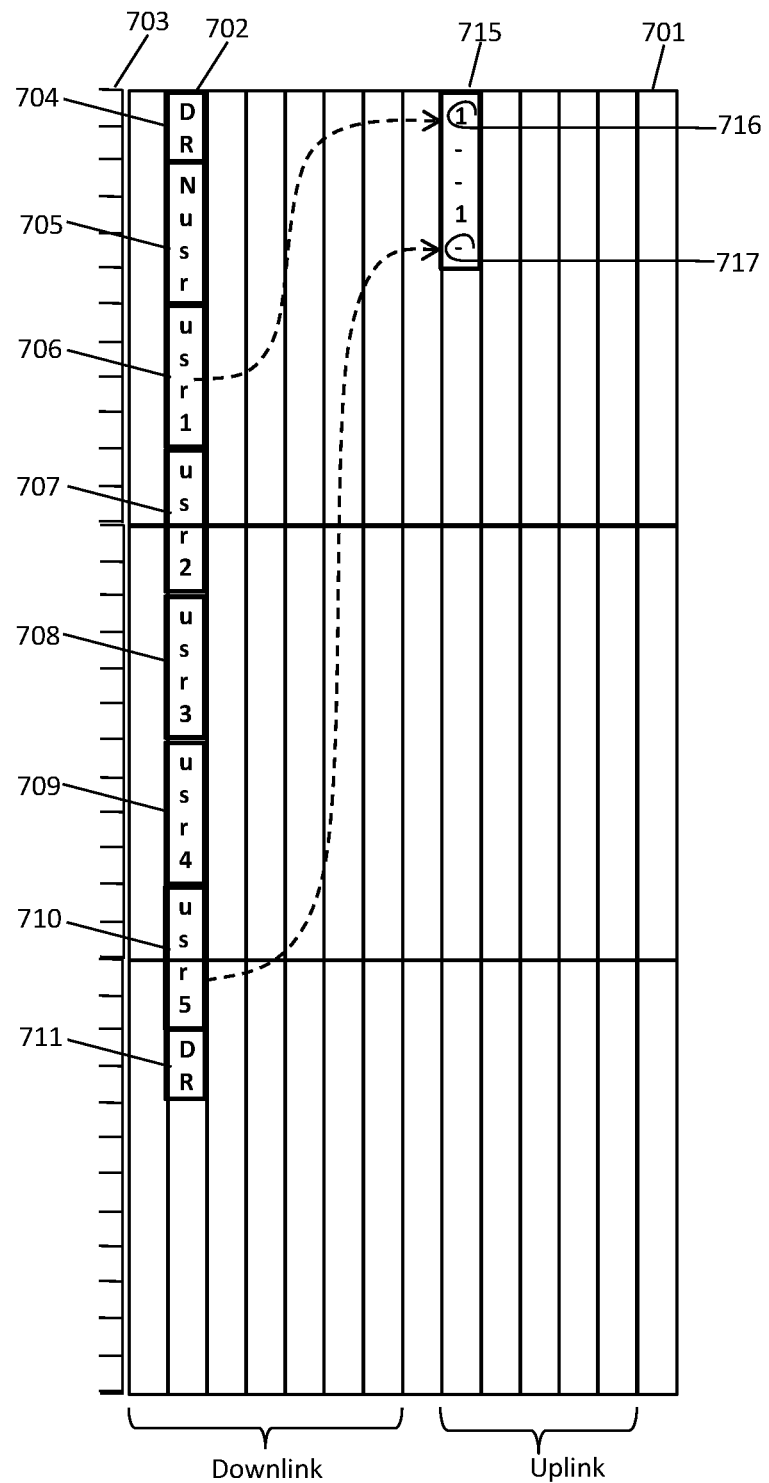
FIG. 7A is a schematic showing an exemplary embodiment of a resource grid including a polling message for large networks, according to some embodiments.

FIG. 7A is a schematic showing an exemplary embodiment of a resource grid including a polling message for large networks, according to some embodiments. As depicted in this non-limiting example, user devices may be specified according to their array address or network-issued identification code such as RNTI code (such as a C-RNTI or cell radio network temporary identification code, for example) instead of a section number. In this example, there is no polling index or sections; instead, the network-assigned identification codes are used to specify which user devices have incoming messages on hold.

The figure includes a resource grid 701 with subcarriers 703 and a polling message 702 with an uplink reply region 715. The polling message 702 may include a demodulation reference "DR" 704, followed by a field indicating a number of user devices that have messages on hold, or "Nusr" 705. In this case there are five user devices with messages. The identification codes of the five user devices may then be listed as "usr1", "usr2", "usr3", "usr4", "usr5" or 706, 707, 708, 709, 710 respectively. The polling message 702 may then end with another demodulation reference 711, and optionally a CRC or other error-detection code.

If the network includes, say, 65536 user devices (or room for that many), then each user device identification 706-710 can be specified in four resource elements at 16QAM, as shown. Thus the RNTI codes, which are 16 bits by convention, can be used as the identifiers.

Each of the identified user devices, if it is ready to receive its message, can request the message by transmitting a short signal during the uplink reply region 715. The order or subcarrier, for each user device to transmit its signal, is according to the order of each user device being listed in the polling message 702. For example, the first-listed user device "usr1" 706 may transmit a request signal 716 on the first subcarrier of the uplink reply region 715, and the fifth-listed user device "usr5" 710 may transmit on the fifth subcarrier 717, as indicated by curvy dashed arrows. In the depicted example, the first and fourth user devices 706, 709 are awake and request their messages in the first and fourth positions of the uplink reply region 715, while the other user devices are still asleep as indicated by a dash "-" at those positions.

An advantage of identifying the user devices according to their pre-assigned RNTI codes, instead of a section number and position, may be that the RNTI codes are already known to the network and to the user device, thereby avoiding the need for an extra identification parameter. Another advantage may be that the RNTI types of codes are generally 16-bit codes, and therefore can accommodate large networks. Another advantage may be compactness, since the DRX message service for over 65k user devices may be provided in 28 resource elements, plus the uplink reply region, assuming 16QAM modulation and short-form demodulation references. As mentioned, the polling message 702 may be broken into multiple portions and transmitted on sequential symbol-times if desired by reduced-capability user devices.

Figure 7B:
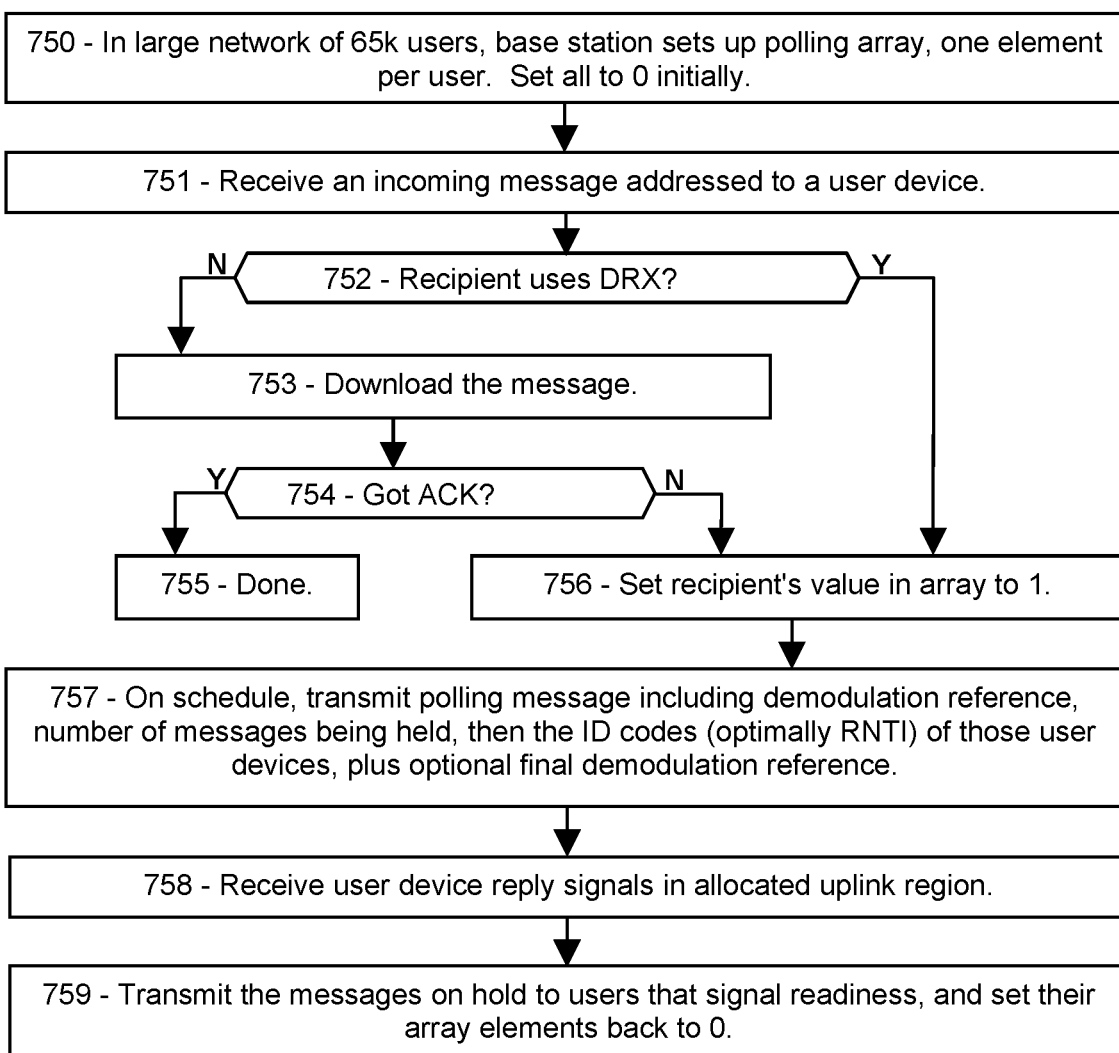
FIG. 7B is a flowchart showing an exemplary embodiment of a process for broadcasting a polling message for large networks, according to some embodiments.

FIG. 7B is a flowchart showing an exemplary embodiment of a process for broadcasting a polling message for large networks, according to some embodiments. As depicted in this non-limiting example, a network such as autonomous sensors and actuators of an mMTC environment may have potentially 65k registered user devices. At 750, a base station or core network prepares a polling array, one array element per user device or potential user device, all values initially zero. At 751, the base station or core network receives an incoming message addressed to one of the registered user devices.

At 752, the base station or core network determines, from prior messaging for example, whether the recipient uses DRX. If so, then the base station or core network sets the recipient's array element to 1 at 756. If the user device does not use DRX, the base station can attempt to download the message to the user device at 753, for example in the next downlink scheduled interval. At 754, after transmitting the message, the base station or core network determines whether a positive acknowledgement has been received from the user device, and if so, the task is done at 755. If the base station or core network receives a NACK or no acknowledgement at all, then at 756 the base station or core network sets the recipient's array element to 1, and stores the message for later transmission.

At 757, on a pre-arranged schedule, the base station or core network broadcasts a polling message. The polling message may include a demodulation reference, configured to support demodulation of the rest of the message, such as 16QAM or 256QAM or other modulation scheme for example. The polling message may further indicate the number of user devices that currently have messages on hold in the network. The polling message may then list the identification codes (such as the polling array positions or the RNTI codes) of those user devices. The polling message may further include a CRC or other error-detection code and/or a final demodulation reference. The user devices can receive the polling message, demodulate and interpret it, and thereby determine the identification codes of the user devices that have a message on hold. Those user devices, if they are awake and ready to receive the message, may then transmit a short signal on an allocated uplink reply region. Each user device listed in the polling message may be assigned one of the positions of the uplink reply region, with the order of listing equal to the order of assigned subcarriers, for example. Then, at the assigned position or subcarrier according to the order of identification codes in the polling message, each listed user device can transmit its signal. The first-identified user device can transmit its signal on the first position or subcarrier of the uplink reply region, the second on the second, and so forth.

At 758, the base station or core network receives and analyzes the uplink reply signals, if any, and determines the identity of each user device that transmits a reply signal. For example, the base station or core network can note which position or subcarrier or frequency that each uplink signal appears on, and can then correlate that position with the order of listing of identification codes in the polling message.

At 759, the base station or core network transmits the requested message or messages to the recipients and, upon acknowledgement, sets their array values back to 0. Any remaining undelivered messages can be requested in a subsequent polling session.

An advantage of providing the identification codes of the user devices in the polling message may be simplicity, since the RNTI codes are already known to the user devices and the network. Another advantage may be that non-DRX devices, which fail to receive their messages on the first attempt, may then be served automatically by the polling message procedure, while avoiding the complexity and uncertainty and overhead of the H-ARQ processes. Another advantage may be to avoid wasting resources when the recipient remains inaccessible during multiple futile download attempts.

In summary, a base station may accommodate DRX users by holding incoming messages until the recipients are ready to receive them, and may periodically alert any ready devices of the message availability using a polling message that specifies each user device's identification code. In addition, the base station may allocate an uplink reply region for the listed user devices to request their messages without expenditure of unnecessary energy in handshaking etc. The base station may prepare a polling array with one entry per user device, and set the array values as each message is received, and reset the array values as each message is forwarded to the recipient. The user devices, upon discovering that they have a message waiting, may then request the message by transmitting a short signal in an allocated uplink reply region.

When implemented in a wireless communication environment, the systems and methods disclosed herein may avoid wasted time and futile download attempts to unavailable DRX users, while promptly serving those user devices that are ready to receive their messages. In addition, the DRX users may synchronize their awake times to the predetermined polling message schedule, and thereby obtain their incoming messages without further delay, according to some embodiments.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a base station of a wireless network to poll user devices of the wireless network, the method comprising:
   a) transmitting a polling array comprising a plurality of polling elements, wherein each polling element is associated with one of the user devices respectively, and each polling element comprises one resource element, wherein each polling element is set to a first value when the base station is holding a message for the associated user device, and to a second value when the base station is not holding a message for the associated user device;
   b) allocating a reply region comprising a plurality of reply elements, each reply element assigned to one of the user devices respectively;
   c) monitoring the reply region to detect single-bit reply signals from the user devices; and
   d) for each reply signal detected in the reply region, determining which user device requests transmission of a message on hold.

2. The method of claim 1, wherein the polling array is transmitted according to 5G or 6G technology.

3. The method of claim 1, further comprising:
   a) determining a plurality of sections, each section comprising a subset of the user devices, such that each user device belongs to no more than one section; and
   b) transmitting an index array comprising index elements, each index element corresponding to one of the sections respectively, wherein each index element is set to the first value if the corresponding section includes at least one user device with a holding message, and to the second value if the corresponding section includes no user devices with a holding message.

4. The method of claim 3, wherein:
a) the polling array includes each section that, in the index array, is indicated by the first value; and
b) the polling array excludes each section that, in the index array, is indicated by the second value.

5. The method of claim 4, wherein:
a) each polling element comprises a single resource element set to the first or second value;
b) wherein the first value comprises radio transmission; and
c) wherein the second value comprises radio silence.

6. The method of claim 4, wherein:
a) each section of the polling array occupies a rectangular region of a resource grid comprising integer Nsub subcarriers and integer Nsym symbol-times; and
b) the reply region comprises another rectangular region of the resource grid comprising Nsub subcarriers and Nsym symbol-times.

7. The method of claim 4, wherein the determining which user device requests transmission of a message on hold comprises:
a) determining, for each particular reply element set to the first value, which particular user device is assigned to the particular reply element; and
b) transmitting, to the particular user device, a message on hold addressed to the particular user device.

8. The method of claim 4, wherein:
a) the polling message is transmitted on a particular set of sequential subcarriers at a first symbol-time;
b) the reply region comprises the particular set of sequential subcarriers at a second symbol-time later than the first symbol-time; and
c) the reply element of a particular user device is on the same subcarrier as the polling element of the particular user device.

9. The method of claim 3, wherein:
a) the reply region includes resource elements for each section that is indicated, in the index array, by the first value; and
b) the reply array includes no resource elements for each section that is indicated, in the index array, by the second value.

10. The method of claim 1, wherein:
a) each polling element is modulated according to a polling scheme that encodes integer Nbit bits per message element;
b) each bit of the message element is associated with a different user device; and
c) each bit is set to a binary "1" when the base station has a message on hold addressed to the associated user device, and to a binary "0" when the base station has no messages on hold addressed to the associated user device.

11. A particular user device, of a wireless network comprising a plurality of user devices, the particular user device configured to:
a) receive, from a base station, one or more messages indicating a section number of a particular section and a position number of a particular position within the particular section;
b) at a predetermined time and frequency, receive an index message indicating one or more sections;
c) determine, according to the index message, whether the particular section is indicated in the index message;
d) receive the polling message comprising polling elements of sections that are indicated in the index message, wherein each polling element indicates whether one of the user devices has an incoming message waiting at the base station; and
e) if the particular section is included in the polling message, determine, according to a particular polling element of the polling message, whether the particular user device has an incoming message waiting at the base station.

12. The particular user device of claim 11, further comprising:
a) locating the particular polling element by counting a number of sections indicated in the index message before the particular section, then multiplying the number by a length of each section, and then adding the particular position.

13. The particular user device of claim 11, further configured to:
a) receive or determine a time and a frequency of a reply region comprising a region of a resource grid; and
b) if the particular user device determines, according to the polling message, that the particular user device has an incoming message waiting at the base station, transmit a radio signal in a particular reply element of the reply region, wherein the particular reply element is associated with the particular user device.

14. The particular user device of claim 13, wherein the particular reply element is transmitted on the same subcarrier as the particular polling element.

15. The particular user device of claim 11, wherein:
a) the number of sections is integer Nsect and the number of positions in each section is integer Npos; and
b) Npos equals Nsect.

16. Non-transitory computer-readable media in a base station or core network of a wireless network, the wireless network comprising a plurality of user devices in signal communication with the base station, the media containing instructions that when implemented by a computing environment cause a method to be performed, the method comprising:
a) determining integer Nsect sections, each section comprising integer Npos positions within the section;
b) assigning each user device to one of the sections and one of the positions, respectively;
c) determining which sections include at least one waiting user device, wherein a waiting user device is a user device that has a message holding in the base station;
d) determining how many waiting sections are in the network, wherein a waiting section includes at least one waiting user device; and
e) determining how many waiting user devices are in each waiting section.

17. The media of claim 16, the method further comprising:
a) transmitting an index message indicating the number of waiting sections, and further indicating the section numbers of the waiting sections; and
b) transmitting a polling message indicating, for each waiting section, the number of user devices in that waiting section, and further indicating the position numbers of the waiting user devices in that waiting section.

18. The media of claim 16, the method further comprising:
a) transmitting a polling message indicating, for each waiting section:

i) the waiting section number;
ii) the number of waiting user devices in that waiting section; and
iii) the positions of those waiting user devices in that waiting section.

19. The media of claim 16, the method further comprising:
   a) transmitting a polling message indicating how many waiting user devices are in the network, and further indicating an identification code of each waiting user device.

20. The media of claim 16, the method further comprising:
   a) allocating a reply region comprising a number Nreply of reply elements, Nreply equal to a total number of waiting user devices in the network, wherein each reply element is assigned to one of the waiting user devices, wherein the order of reply elements is the same as the order of waiting user devices listed in the polling message;
   b) receiving signals within the reply region;
   c) determining, according to which of the reply elements include the signals, which of the waiting user devices is available to receive a message holding in the base station.

* * * * *